(12) United States Patent
Kirshenbaum

(10) Patent No.: US 8,738,656 B2
(45) Date of Patent: May 27, 2014

(54) METHOD AND SYSTEM FOR PROCESSING A GROUP OF RESOURCE IDENTIFIERS

(75) Inventor: Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 478 days.

(21) Appl. No.: 12/861,736

(22) Filed: Aug. 23, 2010

(65) Prior Publication Data
US 2012/0047180 A1 Feb. 23, 2012

(51) Int. Cl.
*G06F 17/30* (2006.01)
(52) U.S. Cl.
USPC .......................................................... 707/797
(58) Field of Classification Search
None
See application file for complete search history.

(56) References Cited

U.S. PATENT DOCUMENTS

| | | | |
|---|---|---|---|
| 6,311,216 B1 | 10/2001 | Smith et al. | |
| 6,556,983 B1 * | 4/2003 | Altschuler et al. | 706/55 |
| 7,472,167 B2 | 12/2008 | Tarquini | |
| 7,523,171 B2 | 4/2009 | Burckart et al. | |
| 7,590,707 B2 | 9/2009 | McCloy, III et al. | |
| 2002/0069218 A1 * | 6/2002 | Sull et al. | 707/501.1 |
| 2009/0144447 A1 | 6/2009 | Wittig et al. | |
| 2009/0164485 A1 | 6/2009 | Burke et al. | |
| 2010/0077092 A1 * | 3/2010 | Akaboshi | 709/230 |
| 2010/0293116 A1 * | 11/2010 | Feng et al. | 706/12 |

* cited by examiner

*Primary Examiner* — Bai D. Vu

(57) ABSTRACT

The present disclosure provides a computer-implemented method of processing a group of resource identifiers. The method includes generating a node candidate based on a resource identifier, wherein the node candidate includes a component corresponding to a portion of the resource identifier according to a dimension of specificity. The method also includes adding the lattice node candidate to a corpus lattice based on whether a matching corpus node corresponding to the node candidate is already included in the corpus lattice. The corpus lattice includes corpus nodes corresponding to a plurality of resource identifiers. The method also includes generating a pruned corpus lattice by a process that includes determining that a child node in the corpus lattice is compatible with a parent node of the child node and removing the child node from the corpus lattice. The method also includes generating an output file corresponding to the pruned URL lattice.

20 Claims, 14 Drawing Sheets

METHOD AND SYSTEM FOR PROCESSING A GROUP OF RESOURCE IDENTIFIERS

BACKGROUND

Marketing on the World Wide Web (the Web) is a significant business. Users often purchase products through a company's Website. Further, advertising revenue can be generated in the form of payments to the host or owner of a Website when users click on advertisements that appear on the Website. The online activity of millions of Website users generates an enormous database of potentially useful information regarding the desires of customers and trends in Internet usage. Understanding the desires and trends of online users may allow a business to better position itself within the online marketplace.

However, processing such a large pool of data to extract the useful information presents many challenges. For example, the different online entities that generate electronic documents may use different techniques or codes to represent similar information. Techniques for identifying the significance of certain information may not be readily available.

BRIEF DESCRIPTION OF THE DRAWINGS

Certain embodiments are described in the following detailed description and in reference to the drawings, in which.

DETAILED DESCRIPTION OF SPECIFIC EMBODIMENTS

Figure 1:
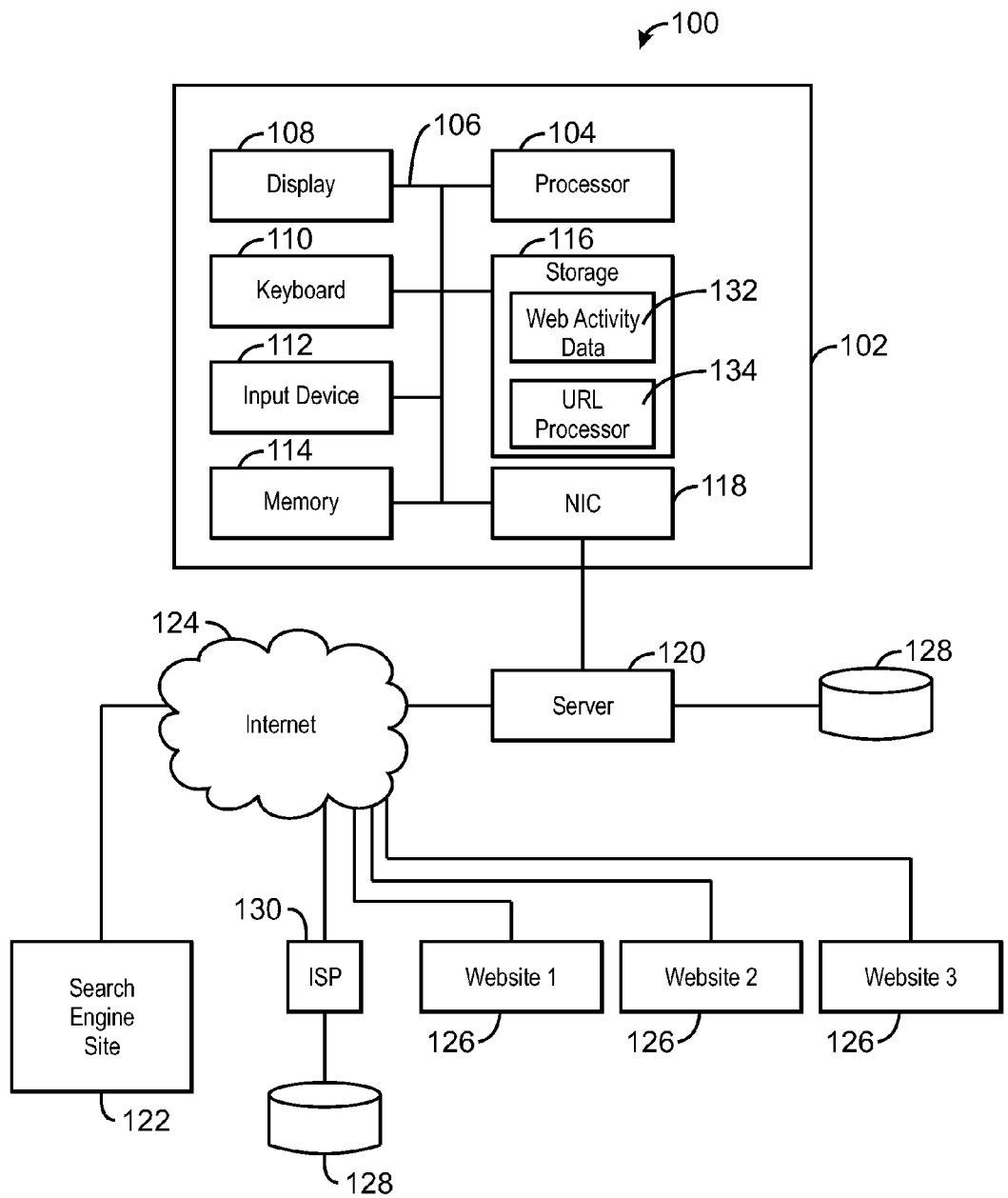
FIG. 1 is a block diagram of a system that may be used to process URLs, in accordance with embodiments of the present invention.

Embodiments of the present invention provide techniques for automatically determining sets of rules for handling resources specified by resource identifiers. A "resource" can be any actual or conceptual entity on or off of a computer system. It may, among other things, be a web page, a file, a database table, a book, a person, a device, a building, an organization, a product, or an event. It may also be a portion of any of these. A "resource identifier" is a computer-manipulable entity (such as a character string or graph) that stands for or identifies a particular resource. In some cases, a resource identifier may identify any of a set of resources considered to be equivalent. In some cases, a resource identifier may only identify a particular resource when interpreted relative to a particular context. One important and well-known example of a resource identifier is a "uniform resource locator" (URL), used to identify a web page by specifying (1) the scheme or protocol (e.g., Hyper-Text Transfer Protocol ("http:"), Secure HTTP ("https:"), or File Transfer Protocol ("ftp:")) to be used to access it, the name of the server to connect to, and the path on the server to the web page. URLs may also be used to identify objects other than web pages, such as e-mail mailboxes ("mailto:"), computers ("telnet:"), telephone numbers ("tel:"), files on the local computer system ("file:"), and files accessible using source-control systems such as Subversion ("svn:"). Many other URL schemes have been standardized, are in use without having been standardized, and will be used and standardized in the future. Other forms of resource identifier need not follow the URL syntax. For example, a postal mail address may be construed as a resource identifier identifying a building or mailbox.

A resource identifier may have one or more "dimensions of specificity" such that a partially-specified (and not necessarily syntactically correct) resource identifier may be seen as a generalization of any of a set of fully-specified resource identifiers. For instance, a URL specifying a web page has (at least) two dimensions of specificity. The "hostname" (or "host") allows generalizations running from "any host", through "any host in this top-level domain", "any host in this second-level domain", etc., up to "this specific host". Similarly, the "path" represents generalizations from "any page on this server" through "any page in this directory", down to "this specific page". Other forms of resource identifier may have similar hierarchical structure. For example, a telephone number has country codes, area codes, exchanges, phone numbers, and extensions. A postal address has countries, states, zip codes, streets, building numbers, suite numbers, and recipient names. An event, such as an employee (a member of a group within a department within a company) reserving a room (on a floor within a building within an organization) at a particular time (within a day within a week ...) for a particular duration may have several dimensions of specificity corresponding to its various components. A partially-specified resource identifier need not be fully specified down to a particular point in the hierarchy implied by a particular dimension of specificity. For example, a partially-specified date may match all date identifiers for dates on Saturday or Sunday, or a partially-specified person may match all identifiers for people in human resources departments of any company.

In this specification, references to web pages should be understood to be exemplary and standing for any identifiable resources, references to URLs should be understood to be exemplary and standing for any form of resource identifier, and references to hostnames and paths should be understood to be exemplary and standing for any dimensions of specificity.

Embodiments of the present invention provide techniques for processing Web activity of a large number of Internet users across a variety of different Websites using uniform resource locators (URLs). The generation of URLs by computers accessing certain resources may provide a useful collection of information for data mining. For example, a collection of query URLs generated by a large numbers of Internet users may be data mined to provide useful statistics regarding the combined Web activity of large number of users.

In URL data mining, there exist various situations in which it is desirable to characterize URLs such that common processing rules may be applied to URLs that exhibit a particular pattern. For example, to extract useful information from a URL such as a search term used in a query URL, it is useful to be able to identify particular types of URLs to determine which data fields of the query URL may contain search terms. Embodiments of the present invention provide techniques for characterizing URLs by identifying common patterns among groups of URLs. The URLs that exhibit a common pattern can be processed according to a common set of URL processing rules. In some cases, a URL may be characterized according to several patterns that relate to different levels of specificity. In this case, rules pertaining to more specific patterns may be used in preference to rules pertaining to less specific patterns.

To identify the URL patterns, a group of URLs, referred to herein as a "URL corpus," may be processed according to a decision procedure that determines whether it is desirable for a particular purpose for a group of URLs to be governed by the same rule, and, if so, what that rule should be. Some of the URLs of the URL corpus may be grouped together in a lattice structure based, in part, on the host and path associated with each URL. As discussed further below, each URL or subset of URLs in the URL corpus may have an associated data set, which is generated differently depending the particular use case and may relate to data extracted from the query field of the URL. The data set associated with each URL or subset of URLs may be analyzed to determine whether the corresponding URLs fit a particular pattern.

As described further below, the techniques disclosed herein may be applied in various stages of a computer-implemented process for generating a URL recognizer. In an embodiment, the output data structure may be a set of data tables used by a URL recognizer to extract useful information contained therein. In an embodiment, the output data structure may be a grouping of URLs, referred to herein as "cases," which may be used by a training system to generate a URL classifier.

FIG. 1 is a block diagram of a system that may be used to process URLs, in accordance with embodiments of the present invention. The system is generally referred to by the reference number 100. Those of ordinary skill in the art will appreciate that the functional blocks and devices shown in FIG. 1 may comprise hardware elements including circuitry, software elements including computer code stored on a non-transitory, machine-readable medium, or a combination of both hardware and software elements. Further, the configuration is not limited to that shown in FIG. 1, as any number of functional blocks and devices may be used in embodiments of the present invention. Those of ordinary skill in the art would readily be able to define specific functional blocks based on design considerations for a particular electronic device.

As illustrated in FIG. 1, the system 100 may include a computing device 102, which will generally include a processor 104 connected through a bus 106 to a display 108, a keyboard 110, and one or more input devices 112, such as a mouse, touch screen, or keyboard. In an embodiment, the device 102 is a general-purpose computing device, for example, a desktop computer, laptop computer, business server, and the like. The computing device 102 can also have one or more types of non-transitory, computer readable media, such as a memory 114 that may be used during the execution of various operating programs, including operating programs used in embodiments of the present invention. The memory 114 may include read-only memory (ROM), random access memory (RAM), and the like. The device 102 can also include other non-transitory, computer readable media, such as a storage system 116 for the long-term storage of operating programs and data, including the operating programs and data used in embodiments of the present invention.

In an embodiment, the device 102 includes a network interface controller (NIC) 118, for connecting the device 102 to a server 120. The computing device 102 may be communicatively coupled to the server 120 through a local area network (LAN), a wide-area network (WAN), or another network configuration. The server 120 may have a non-transitory, computer readable media, such as storage device, for storing enterprise data, buffering communications, and storing operating programs of the server 120. Through the server 120, the computing device 102 can access a search engine site 122 connected to the Internet 124. In an embodiment, the search engine 122 includes generic search engines, such as GOOGLE™, YAHOO®, BING™, and the like. The computing device 102 can also access Websites 126 through the Internet 124. Each of the Websites 126 can include a single Webpage or multiple Webpages arranged in a hierarchical tree. Although the Websites 126 are actually virtual constructs that are hosted by Web servers, they are described herein as individual (physical) entities, as multiple Websites 126 may be hosted by a single Web server and each Website 126 may collect or provide information about particular users. Further, each Website 126 will generally have a separate identification, such as a hostname of a uniform resource locator (URL), and will function as an individual entity.

The Websites 126 may also provide search functions, for example, searching subpages to locate products or publications provided by the Website 126. For example, the Websites 126 may include sites such as EBAY®, AMAZON.COM®, WIKIPEDIA™, CRAIGSLIST™, CNN.COM™, and the like. Further, the search engine site 122 and one or more of the Websites 126 may be configured to monitor the online activity of a visitor to the Website 126, for example, regarding searches performed by the visitor. Such monitoring may also (or alternatively) take place on the user's computer (by the browser, a browser plug-in, a separate process, the operating system, or the network interface card), by a component on the network, such as a router or proxy, or by the user's ISP. As used herein, the term "online activity" refers to any activity that may be performed over a network, for example, accessing Webpages on the Internet, performing searches, providing data to a Website, and the like. Online activity should be taken as exemplary. In other embodiments other behavior may result in the generation of resource identifiers, for example, placing phone calls, purchasing items, scheduling meetings, accessing files, or running or installing programs.

The computing device 102 and server 120 may also be able to access a database 128, which may be connected to the server 120 through the local network or to an Internet service provider (ISP) 130 on the Internet 124, for example. The database 128 may be accessed to obtain a collection of Web activity data 132 to be processed in accordance with embodiments of the present inventions. As used herein, a "database" is an integrated collection of logically related data that consolidates information previously stored in separate locations into a common pool of records that provide data for an application.

The computing device 102 may also include a collection of Web activity data 132, for example, obtained from the database 128. The Web activity data 132 may be processed in accordance with the techniques described herein to generate statistical data that may be useful to identify various market characteristics and trends. In an embodiment of the present invention, the Web activity data 132 is stored, for example, in the storage system 116, and may include Web activity data 132 for a plurality of Internet browsers generated at a plurality of Websites. The Web activity data 132 may include records of the Web pages clicked on by individual browsers, the Hyper Text Markup Language (HTML) or eXtensible Markup Language (XML) content of Web pages, the results of Web searches that have been performed at various Websites, and the like. The Web activity data 132 may also include URL data, for example, a collection of query URLs that represent searches performed by a Web browser. In addition to being obtained from the database 128, the Web activity data 132 may be provided to the computing device 102 via a storage medium, for example, the database 128, a portable storage medium such as a compact disk (CD), and the like.

The computing device 102 may also include a URL processor 134. The URL processor 134 may be used to execute a URL processing technique that includes a lattice-building process, a lattice-pruning process, and an output process. During the lattice building process, a lattice, referred to herein as a "corpus lattice" may be generated that combines URLs that have the potential for fitting a common pattern based on the host and path components of the URLs. During the lattice-building process a data set may be generated for each node of the corpus lattice, based in part of the query fields of each URL associated with the node. The corpus lattice may be pruned based on a decision procedure, which specifies how to make decisions based on the data sets and/or patterns associated with nodes of the corpus lattice. In an embodiment, the pruning process results in a pruned corpus lattice that includes a set of leaves (nodes that have no child nodes), each leaf representing a different rule that can be applied to URLs that match the pattern associated with the leaf. An output data structure can be generated based on the pruned corpus lattice. The output data structure may include, for example, a file, data structure, database table, source code, document, and the like. Embodiments of the present techniques may be better understood with reference to FIG. 2.

Figure 2:
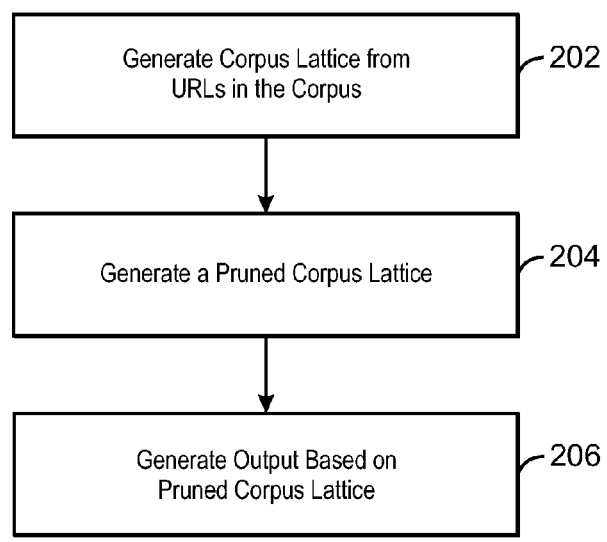
FIG. 2 is a process flow diagram of an overview of a method of processing Web activity data, in accordance with embodiments of the present invention.

FIG. 2 is a process flow diagram of an overview of a method of processing Web activity data to identify patterns in URLs, in accordance with embodiments of the present invention. The method is generally referred to by the reference number 200 and may be executed by the URL processor 134 (FIG. 1). The method 200 may begin at block 202 with the lattice-building process, wherein a corpus lattice is generated based on the URLs in the URL corpus. The corpus lattice includes a plurality of nodes referred to herein as "corpus nodes."

During the lattice-building process of block 202, a smaller lattice, referred to herein as a "URL lattice" may be built. The URL lattice may be a lattice generated from a single URL or a group of URLs sharing some common attribute, such as the same host and path. The URL lattice can include a plurality of nodes, referred to herein as "URL nodes." Techniques for generating a URL lattice are described further in relation to FIGS. 3 and 4. During the lattice-building process, each URL node of the URL lattice may be treated as a candidate to be added to the corpus lattice, and is referred to herein as a "node candidate." Node candidates may be added to the corpus lattice based on whether a corpus node corresponding to the node candidate already exists in the corpus lattice. Thus, the corpus lattice represents the merger of the URL lattices generated from the URLs in the URL corpus.

As described further below, the corpus lattice may be generated in a lazy manner. Constructing the corpus lattice in a lazy manner means that node candidates are added to the corpus lattice only when it is determined that the resulting corpus node may be useful for generalizing over multiple URLs or distinguishing between URLs. As described further below, the corpus nodes can include a corresponding data set that can be used during the lattice-pruning process of block 204 to determine whether corpus nodes are compatible with one another. Techniques for generating a corpus lattice in a lazy manner are described further in relation to FIG. 6.

At block 204, the lattice-pruning process is implemented to generate a pruned corpus lattice. The pruned corpus lattice may be generated by removing child nodes if the data sets associated with child nodes are compatible with one another and compatible with a parent node of the child nodes, as determined from the corresponding data sets. Determinations regarding whether corpus nodes are compatible may be made according to a task-specific decision procedure as implemented by an instruction module referred to herein as a "monitor." The monitor may be a programmatic "object" provided as an input to method 200 or it may be integral to the implementation of method 200. The data set associated with a pruned child node may be combined with the data set corresponding to the child's parent node. Thus, each corpus node of the resulting pruned corpus lattice represents a URL pattern that corresponds with URLs that may be processed according to some common rule. The corpus nodes that are located at a lower level of the corpus lattice represent more specific URL patterns, while corpus nodes at located at a higher level of the corpus lattice represent more general URL patterns. In an embodiment, the rules applied to URLs corresponding to a lower level of the corpus lattice may be used in preference to the rules applied to URLs corresponding to corpus nodes located at a higher level of the lattice. An example of a pruned URL lattice is described further in relation to FIG. 7. Techniques for generating a pruned corpus lattice are described further in relation to FIGS. 8A, 8B, and 8C.

At block 206, an output data structure corresponding to the corpus lattice is generated. The output data structure may be any organized electronic representation of the data contained in the corpus lattice, such as data base tables, source code, files, and other types of data structures. In embodiments, the output data structure may also be a report or document, such as a printed document or a document published on-line. The output data structure can be used to process newly encountered URLs according to the rules identified for the various URL patterns represented by each of the corpus nodes. The use of the output data structure may vary depending on the particular use case. In an embodiment, the output data structure may include a database of information tables used by a URL recognizer. In an embodiment, the output data structure may be a grouping of URLs referred to herein as "cases," which may be used to construct a classifier. Techniques for generating an output data structure based on the pruned corpus lattice are described further in relation to FIG. 9.

Generating a URL Lattice

Figure 3:
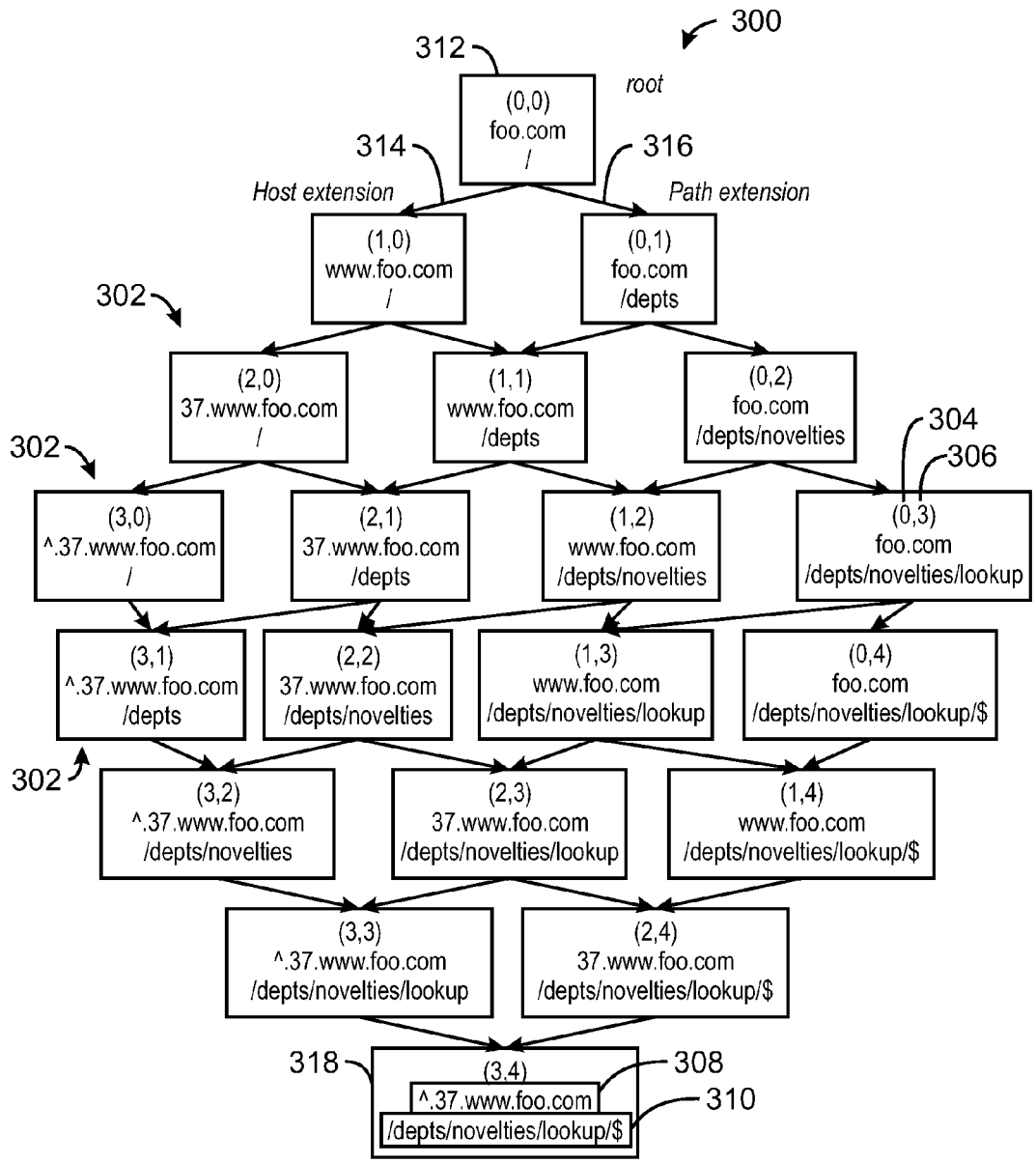
FIG. 3 is a diagram of a URL lattice generated from one of the URLs in the Web activity data, in accordance with embodiments of the present invention.

FIG. 3 is a diagram of a URL lattice generated from one of the URLs in the Web activity data, in accordance with embodiments of the present invention. The URL lattice is referred to by the reference number 300 and can represent a single URL or a group of URLs with the same host and path. The URL lattice 300 shown in the example of FIG. 3 was generated using a hypothetical query URL of the form:

http://www37.foo.com/depts/novelties/
lookup?k1=v1&k2=v2&k3=v3

In the above query URL, the "host" is the portion of the URL that precedes the first single forward slash, in this case "http://www37.foo.com", the "path" is everything from the first single forward slash (when one exists) that precedes the question mark, in this case "/depts/novelties/lookup", and the "query field" of the query URL is everything that follows the question mark. Furthermore, the query field of the query URL may include one or more data fields, which may be separated by ampersands. Each data field may include a data field name, for example, "k1", and a data field value, for example, "v1". In the example query URL provided above, the query URL includes three data fields, namely "k1", which has the value "v1", "k2", which has the value "v2", and "k3", which has the value "v3".

It will be appreciated that the naming convention used herein is hypothetical and that any suitable character string may be used to represent the various data field names and values used in an actual query URL. The naming convention used in the query URL may be an ad hoc convention designated for a single Web form or Website. Therefore, a common naming convention used across the multiple Websites is typically not available. For example, a hypothetical search field named "q" may refer to different types of data. In one query URL, "q" may refer to data field that holds a search term entered by a user. However, in another query URL, "q" may refer to something different, for example a data field that holds a desired quantity of a product.

The URL lattice 300 may be represented as a lattice structure that includes a plurality of URL nodes 302. Each URL node 302 may include a set of indices, including a host index 304 and a path index 306, both of which correspond with the relative position of the URL node 302 in the URL lattice 300. Each URL node 302 corresponds with a portion of the URL that includes a host component 308 and a path component 310, both obtained by parsing the URL. During the generation of the URL recognizer data tables, the URL patterns represented by the URL nodes 302 may be stored to a pattern table and used by the URL recognizer to identify newly encountered URLs that exhibit the same or similar pattern.

The host component 308 may represent a suffix of the URL host. In other words, the host component 308 "foo.com" represents any URL host that ends in "foo.com". The path component 310 may represent a prefix of the URL path. In other words, the path component 310 "/depts" represents any URL path that begins with "/depts". Thus, in the above example, during the operation of the URL recognizer, the pattern table entry corresponding to the URL pattern "foo.com/depts", may be used to identify a URL with a host that ends in "foo.com" and a path that begins with "/depts".

Additionally, the host and path components may include an indication that a particular host component 308 or path component 310 represents the exact host or path, as opposed to a host suffix or path prefix. In the example depicted in FIG. 3, the character "^" is used to indicate the exact host, while the character "$" is used to indicate the exact path. It will be appreciated that other characters or other means of indication may be used. These indications are used to identify newly encountered URLs corresponding to an exact match between the host or path of the URL node 302. For example, during the operation of the URL recognizer, the pattern table entry corresponding to the URL pattern "foo.com/depts/novelties/lookup/$" may be used to identify a URL with a host ending with "foo.com" and the exact path "/depts/novelties/lookup". Whereas, the pattern table entry corresponding to the URL pattern "foo.com/depts/novelties/lookup" (without the dollar sign) may be used to identify a URL with a host ending with "foo.com" and any path beginning with "/depts/novelties/lookup".

The URL lattice 300 includes a root node 312, which may be considered to be a most-general node for the URL, and corresponds with the highest level of abstraction of the host component 308 and path component 310 represented in the URL lattice 300. For example, the root node 312 shown in FIG. 3 includes a host component 308 of "foo.com" and a path component 310 of "/". Each URL node 302 includes a host extension 314 and a path extension 316, which connects the root node 312 to its corresponding child nodes. Along the host extension 314, the host component 308 is expanded to include a larger portion of the URL host, resulting in a lower level of abstraction of the host component 308. For example, as shown in FIG. 3, the host extension 314 of the root node 312 leads to a child node with a host component 308 of "www.foo.com" and a path component 310 "/". Along the path extension 316, the host component 308 is expanded to include a larger portion of the URL path, resulting in a lower level of abstraction of the path component 310. For example, as shown in FIG. 3, the host extension 314 of the root node 312 leads to a child node with a host component 308 "foo.com" and a path component 310 "/depts". Each of the URL nodes 302 may have corresponding host and path extensions, depending on whether a lower level of abstraction exists for the host component 308 or path component 310 of the URL node 302. As used herein the term "child node" refers to a URL node 302 that is directly below the corresponding parent node as indicated by the host extension 314 and path extension 316. Each child node corresponds with an extension of either the host component 308 or the path component 310 as compared to the child node's parent node. In an embodiment, some child nodes correspond with an extension of the parent node that includes an Internet Protocol port indication or keyword/value pair from the query field of the URL.

The URL lattice 300 may also include a base node 318 that represent the lowest level of abstraction of the URL. For example, as shown in FIG. 3, the base node 318 includes a representation of the exact URL, namely "^.37.www.foo.com/depts/novelties/lookup/$", which may be a normalized URL, as discussed further below in relation to FIG. 4.

It will be appreciated that URL lattice 300 as depicted in FIG. 3 is a model used to better explain embodiments of the present invention. In an embodiment, the URL nodes 302 of the URL lattice 300 are generated as needed for obtaining a node candidate. In particular, the arrows of FIG. 3 should not be construed as implying the presence of "pointers" or "references" from parent URL nodes 302 to child URL nodes 302 in the memory of computing device 102 nor should FIG. 3 be construed as implying that all or even a plurality of the URL nodes 302 of the URL lattice 300 are realized at any given time. In an embodiment, the data used to generate the URL lattice 300 is stored in a set of tables. Techniques for generating the URL nodes 302 of the URL lattice 300 may be better understood with reference to FIG. 4.

Figure 4:
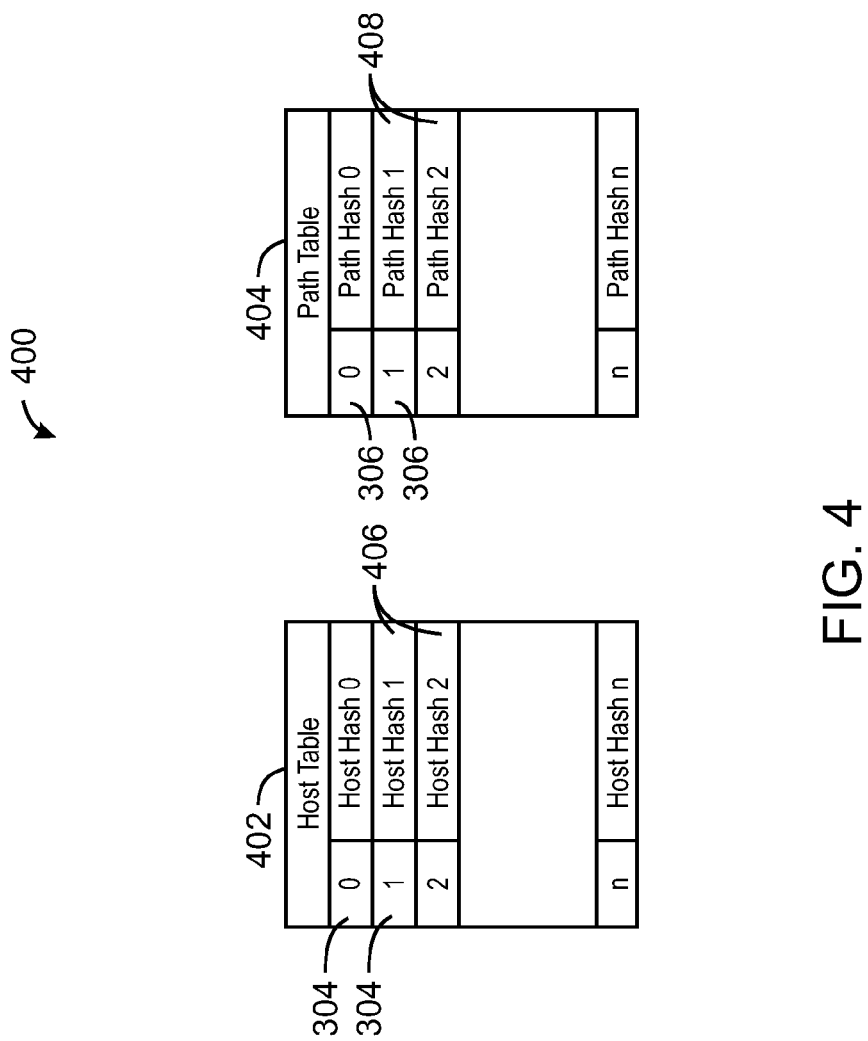
FIG. 4 is a set of URL tables that hold the information corresponding to the URL lattice, in accordance with embodiments of the present invention.

FIG. 4 is a set of URL tables that hold the information corresponding to the URL lattice 400, in accordance with embodiments of the present invention. The URL tables may be stored, for example, in the memory 114 or the storage 116. The information tables may include a host table 402 and a path table 404, which may be represented as arrays, lists, or any other technique that has the properties that it is possible to look up a value given an index or other reference to an entry and that it is possible to determine an index or reference to a next entry given an index or reference. Each entry of the host table 402 includes a hash code, referred to as a host hash 406, corresponding to each of the host components 408 generated from the URL. Each entry of the path table 404 includes a hash code, referred to as a path hash 408, corresponding to each of the path components 310 generated from the URL. Together, the path table 404 and host table 402 may be used to generate a combined hash code corresponding to each URL node 302 of the URL lattice 300 as needed for searching the pattern table. It should be noted that the indexes 304, 306 depicted in FIG. 4 are for clarity only and may not actually be present in the representation of host table 402 or path table 404.

To generate the host table 402, the URL may be parsed into host components 308 using dots as delimiters. Each dot-delimited string of characters may be referred to as a "host segment." To generate the host components 308 a hash code is generated for each host segment using a hashing algorithm. A first hash code is generated for the rightmost host segment and added to the host table 402 at index 0. Each successive host component hash is generated by rotating, right-shifting or otherwise modifying the previous hash code, generating a new hash code for the next leftward host segment, and adding or otherwise injecting the new hash code to the previous hash code of the previous host component 308. An additional host component 308 is generated and added to the host table 402 by creating a fictitious host segment to represent an exact match, where this additional host segment has a predefined hash code, such as the result of using the hashing algorithm on a predefined string such as "^" or "!EXACT MATCH!". In an embodiment, rather than combining hash codes generated for each host segment, the hashing algorithm is applied to data representing the sequence of host segments that correspond to each host component 308. In an embodiment, either due to the particular hashing algorithm used or due to a prior normalization step, certain characters in the host segments (for example, corresponding upper- and lower-case characters) may be treated as equivalent. Each successive hash code is added to the host table 402 in order of abstractness, from more abstract to less abstract, until the host of the URL is fully parsed.

In an embodiment, it may not be useful to include all or part of the top-level domain (TLD) of the URL, for example ".com" or ".co.uk", as a separate host component 308. Thus, the host segment representing the TLD of the URL may be combined with the next leftward host segment to form a single most-general host component 308. In an embodiment, a table of known TLDs may be used to identify the TLD of the URL.

Additionally, some host components 308 may be further processed to transform the host components 308 to a normalized form. For example, if one of the host segments includes textual characters and ends with a number, the text portion and the number portion may be treated as two different host components 308. For example, the host segment "www37" or "www-37" would generate the host components "www" and "37", each of which would be stored to a separate entry of the host table 402. Further, the host components 308 may be re-ordered so that the number portion precedes the host portion when the corresponding URL node 302 is generated, as shown in FIG. 3.

Following the example URL described in relation to FIG. 3, the generation of the hash codes entered into the host table 402 may be represented by the following formulas:

Host Hash 0=$H$(foo.com)=$h$(foo.com)

Host Hash 1=$H$(www.foo.com)=($H$(foo.com)>>1)+$h$(www)

Host Hash 2=$H$(37.www.foo.com)=($H$(www.foo.com)>>1)+$h$(37)

Host Hash 3=$H$(^.37.www.foo.com)=($H$(37.www.foo.com)>>1)+$h$(^)

In the above formulas, the operator ">>1" represents a shift or rotation of the bits of the hash code one bit to the right. Note that the index 304 of each host component hash corresponds with the host index 304 shown in FIG. 3. Additionally, it will be appreciated that the URL components included in the host table 402 may not represent semantically meaningful segments of the URL.

Additionally, the host name may also be checked to ensure that the host name is of a form that may reasonably be expected to return a matching pattern table entry. For example, if the host is of a "dotted quad" form such as "15.4.3.23" or if the host ends in square brackets it is likely that the host name is an IP address and will not match any pattern table entry, in which case, the URL may be ignored and the processing of the URL may terminate.

To generate the path table 404, the URL may be parsed into path components 310 using slashes as delimiters. Each slash-delimited string of characters may be referred to as a "path segment." To generate the path components 310 a hash code is generated for each path segment using a hashing algorithm. A first hash code is generated for the leftmost, empty string, path segment and added to the path table 404 at index 0. In an embodiment, the hash code of the empty string may be a constant. Each successive path component hash is generated by rotating, right-shifting, or otherwise modifying the previous hash code, generating a new hash code for the next rightward path segment, and adding or otherwise injecting the new hash code to the previous hash code of the previous path component 310. An additional path component 310 is generated and added to the path table 404 creating a fictitious path segment to represent an exact match, where this additional path segment has a predefined hash code, such as the result of using the hashing algorithm on a predefined string such as "^" or "!EXACT MATCH!". In an embodiment, rather than combining hash codes generated for each path segment, the hashing algorithm is applied to data representing the sequence of path segments that correspond to each path component 310. In an embodiment, either due to the particular hashing algorithm used or due to a prior normalization step, certain characters in the path segments (for example, corresponding upper- and lower-case characters) may be treated as equivalent. Each successive hash code is added to the path table 404 in order of abstractness, from more abstract to less abstract, until the path of the URL is fully parsed.

Following the example URL described in relation to FIG. 3, the generation of the hash codes entered into the path table 404 may be represented by the following formulas:

Path Hash 0=$H$(/)=constant

Path Hash 1=$H$(/depts)=($H$(/)>>1)+$h$(depts)

Path Hash 2=$H$(/depts/novelties)=($H$(/depts)>>1)+$h$(novelties)

Path Hash 3=$H$(/depts/novelties/lookup)=($H$(/depts/novelties)>>1)+$h$(lookup)

In the above formulas, the operator ">>1" represents a shift or rotation of the bits of the Hash code one bit to the right. Note that the index 306 of each path component hash corresponds with the path index 306 shown in FIG. 3.

Additionally, it will be appreciated that the URL components included in the path table 404 may not represent semantically meaningful segments of the URL.

Additionally, some path components 310 may be further processed to transform the path components 310 to a normalized form. For example, if a path component 310 other than the first path component 310 is empty, such as in "depts// novelties", a constant may be substituted for the hash of the string rather than running the hashing algorithm on the empty string. Furthermore, the path may also be delimited on other characters in addition to slashes, such as, ":", "=", and "_". The normalization rules applied to the path components 310 will generally also be used for generating the pattern table.

The host table 402 and the path table 404 define the entire URL lattice 300 shown in FIG. 3. The host index 304 and path index 306 of each URL node 302 corresponds with the indices into the host table 402 and path table 404. A combined hash code corresponding to each URL node 302 may be obtained by combining the host hash 406 and path hash 408 at the corresponding table entries, by rotation and addition. For example, following the example provided in FIG. 3, URL node 302 (0, 3) corresponds to "foo.com/depts/novelties/lookup", and its hash code is computed by the following formula:

$$H(\text{foo.com/depts/novelties/lookup}) = (H(\text{foo.com}) \gg 1) + H(\text{/depts/novelties/lookup})$$

In the above formula, the hash code H(foo.com) is obtained from index 0 of the host table 402, and the hash code H(/depts/novelties/lookup) is obtained from index 3 of the path table 404. The root node 312 of the URL lattice 300 is position (0,0), "foo.com/", corresponding to any path in any host in domain "foo.com". The base node 318 of the URL lattice 300 is position (3,4), "^.37.www.foo.com/depts/novelties/lookup/$", corresponding to precisely the host and path found in the URL. The links between the URL nodes 302 are implicit in the indexing of the host table 402 and the path table 404. Each host extension 314 refers to the URL node 302 corresponding to incrementing the host table index by one, and each path extension 316 refers to the URL node 302 corresponding to incrementing the path table index by one. So from URL node (1,2), "www.foo.com/depts/novelties", the host extension 314 is (2,2), "37.www.foo.com/depts/novelties" and the path extension 316 is (1,3), "www.foo.com/depts/novelties/lookup". Determining whether a host extension 314 or path extension 316 exists for any given URL node 302 can be determined by checking the length of the appropriate host table 402 or path table 404.

To generate a node candidate for possible addition to the corpus lattice, a combined hash code may be obtained by combining one of the host table entries 404 and one of the path table entries 406. For example, the host hash 406 corresponding to one of the URL nodes 302 may be obtained from the host table 402 using the host probe index, and the path hash 408 corresponding to the URL nodes 302 may be obtained from the path table 404 using the path probe index. The hash code for the node candidate can be generated by shifting or rotating the host hash 406 and adding the result to the path hash 408. In an embodiment, the combined hash codes are generated as needed for adding node candidates to the corpus lattice.

Generating a Corpus Lattice

Figure 5:
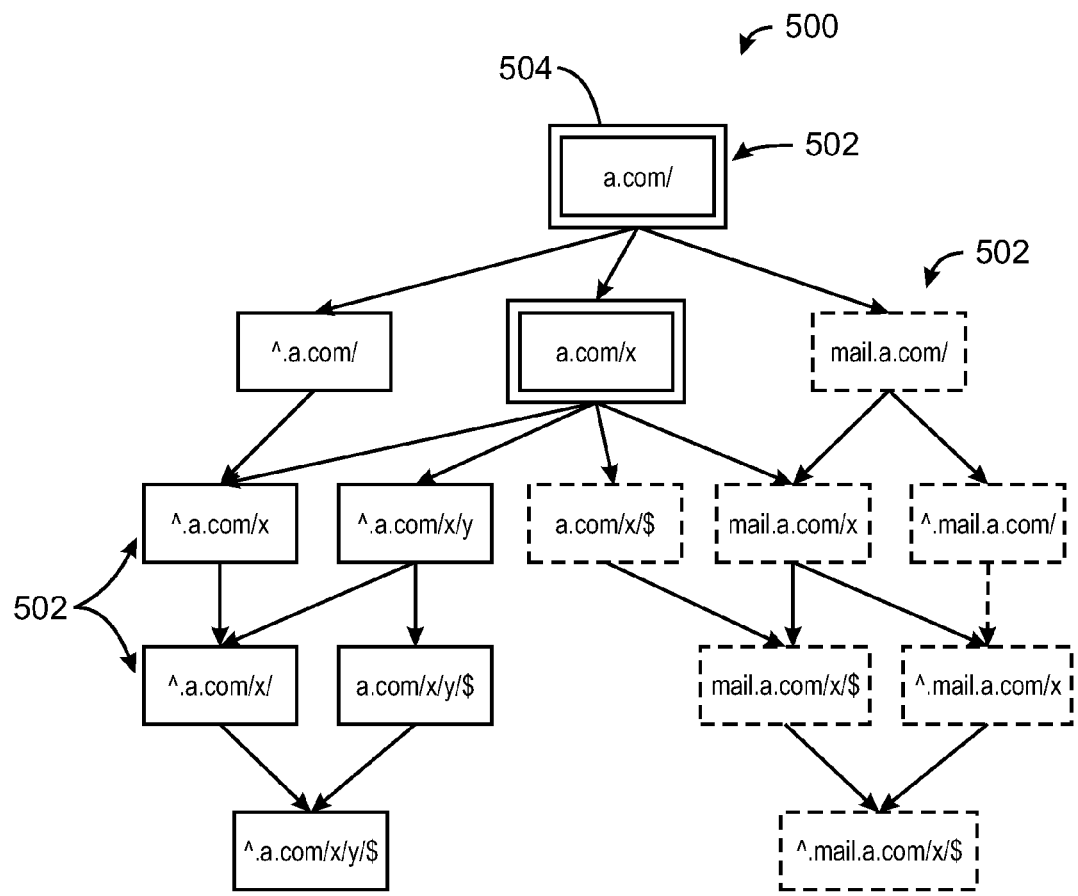
FIG. 5 is a block diagram of a corpus lattice, in accordance with embodiments of the present invention.

FIG. 5 is a block diagram of a corpus lattice, in accordance with embodiments of the present invention. The corpus lattice is referred to by the reference number 500 and represents the merger of two hypothetical URLs, namely "a.com/x/y" and "mail.a.com/x". As shown in FIG. 5, the corpus lattice 500 can include several corpus nodes 502, including one or more root nodes 504. Although, a single root node 504 it shown, it will be understood that a corpus lattice may have several root nodes 504. Each corpus node 502 may have any number of child nodes, which may represent either a minimal extension of the parent node's host or path. Each corpus node 502 may include one or more pointers (or other means) that identify the corpus node's child nodes. Some corpus nodes 502 in the corpus lattice 500 may relate to a single URL, while others may relate to two or more URLs.

The corpus nodes related only to the URL "mail.a.com/x" are shown with a dotted outline. The corpus nodes related only to the URL "a.com/x/y" are shown with a solid outline. The corpus nodes related the both URLs are shown with a double outline. Accordingly, it can be seen that the root node "a.com" and the node "a.com/x" are combined nodes because the URL lattices for both URLs would have the URL nodes corresponding to URL patterns. It will be appreciated that in some embodiments, a single corpus node 502 in the corpus lattice may relate to three or more URLs.

Each corpus node 502 may also include a data set generated from the URLs corresponding to the corpus node 502. For example, the root node 504 shown in FIG. 5 may include a data set corresponding to both of the URLs "mail.a.com/x" and "a.com/x/y". As noted above, the data set may be a characterization of the data fields in the query field of the URLs, such as field states or occurrence counts.

In an embodiment, the corpus lattice 500 may be built by generating a URL lattice 300 for each URL. For each URL node 302 of each URL lattice 300, a corresponding corpus node 502 may be added to the corpus lattice 500 if a corpus node 502 corresponding to the URL node 302 is not already present in the corpus lattice 500. As used herein, the term "node candidate" refers to a URL node 302 that is being considered, during the lattice-building process, for addition to the corpus lattice 500. If the URL node 302 is already present in the corpus lattice 500, the data set of the URL node 302 may be added to the corresponding corpus node 502 of the corpus lattice 500. When a URL node 302 is added to the corpus lattice 500, it is added as a child to the corpus node or nodes corresponding to the URL node's parents in the URL lattice.

In an embodiment, a corpus node 502 in the corpus lattice 500 will be useful only if the corpus node 502 represents a generalization over multiple URLs or distinguishes between URLs. In other words, any corpus node 502 in the corpus lattice 500 whose parent nodes all relate to the same URL would eventually be pruned away during the pruning process. Accordingly, the efficiency of the URL processor 134 may be increased by building the corpus lattice 500 in a lazy manner. In other words, corpus nodes 502 may be added to the corpus lattice 500 only when it is determined that the corpus nodes 502 are likely to be useful. For example, child nodes related to a first node candidate may be added to the corpus lattice 500 when a second node candidate is added to the corpus lattice 500 in a position that is subordinate to the first node candidate. In this way, child nodes are added to the corpus lattice 500 if the corresponding parent node is common to more than one URL. To build the corpus lattice 500 in a lazy manner, each node 502 in the corpus lattice 500 includes an expansion state, which may be set to "expanded" or "unexpanded." The term "expanded node" refers to a corpus node 502 whose children have been added to the corpus lattice 500. The term "unexpanded node" refers to a corpus node 502 whose children have not yet been added. An unexpanded node contains information sufficient to determine corpus nodes 502 to add as children when the unexpanded node is expanded.

Figure 6:
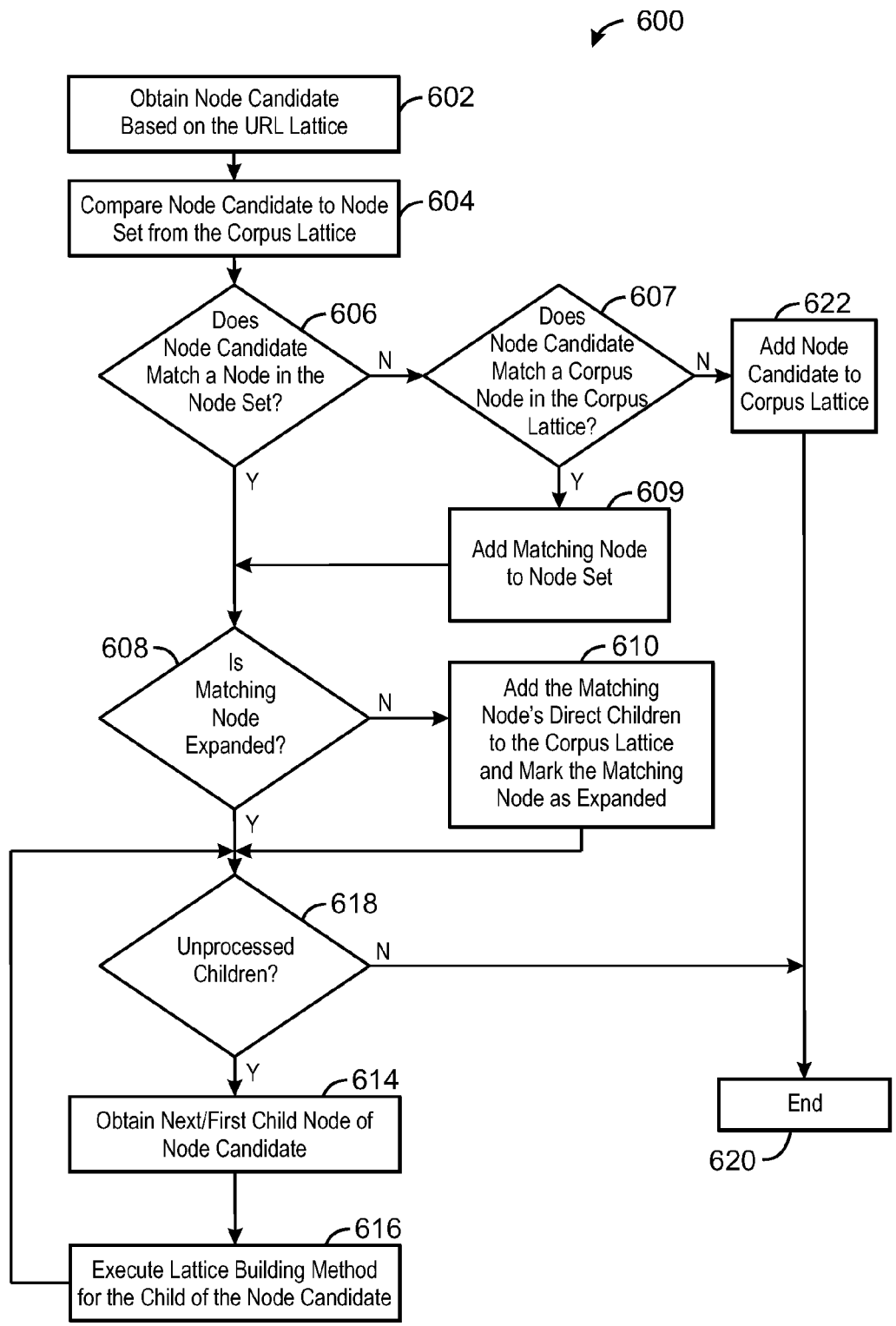
FIG. 6 is a process flow diagram of a method of generating a corpus lattice in a lazy manner, in accordance with embodiments of the present invention.

FIG. 6 is a process flow diagram of a method of generating a corpus lattice in a lazy manner, in accordance with embodiments of the present invention. The method is referred to with the reference number 600, and may be used during the lattice building process to add URL nodes 302 (FIG. 3) from the URL lattice 300 to the corpus lattice 500.

Prior to execution of the method 600 a URL is obtained from the Web Activity Data and a URL lattice 300 is generated based on the URL, as described in relation to FIGS. 3 and 4. Additionally, the data set corresponding to the URL may also be generated. For example, the field set corresponding to the query field of the URL may be generated as discussed above in relation to FIG. 3. As will be described further below, the method 600 may be recursive, in other words, the method 600 may be iterated recursively for child nodes of the URL lattice 300. The method may begin at block 602.

At block 602, a node candidate is obtained based on the URL lattice 300. In a first iteration of the method 600, the node candidate corresponds with the root node 312 of the URL lattice 300 and includes the hash code generated based on the corresponding host and path combination of the corresponding root URL node 312.

At block 604, the node candidate may be compared to a node set from the corpus lattice 500 to determine whether a corpus node 502 corresponding to the node candidate is already included in the corpus lattice 500. This determination may be made by searching the node set from the corpus lattice 500 to identify a hash code matching the hash code of the node candidate. The corpus lattice 500 can have an associated map that maps hash codes to corpus nodes 502, and the node set searched may be the same each time. In an embodiment, during a first iteration of the method 600, the node set can include the root nodes of the corpus lattice 500. Thus, during the first iteration, the root node of the URL lattice 300 is compared to the root nodes of the corpus lattice 500.

At block 606, a determination is made regarding whether the node candidate matches one of the nodes in the node set based on the comparison performed in the previous step. If the node candidate matches a node in the node set, the process flow may advance to block 608, otherwise, the process flow may advance to block 607, where a determination is made regarding whether the node candidate matches a corpus node 502 in the corpus lattice 500. Such a determination may be made by consulting a table of known nodes mapping hash codes to corpus nodes 502. If a matching corpus node 502 is identified, the process flow may advance to block 609. At block 609, the matching corpus node 502 from the corpus lattice 500 is added to the node set, and the process flow may advance to block 608. Because a corpus node 502 matching the node candidate already exists in the corpus lattice 500, the node candidate is not added to the corpus lattice 500. However, the children of the node candidate may not be present in the corpus lattice 500. Therefore, children of the node candidate may be compared to the children of the matching corpus node to determine whether any children of the node candidate should be added.

At block 608, a determination is made regarding whether the matching corpus node is expanded by checking the expansion state of the node. If the matching corpus node is not expanded, the process flow advances to block 610, wherein the child nodes corresponding to the matching corpus node are added to the corpus lattice 500. Specifically, hash values may be computed for each of the child nodes. The hash values may be searched for in a map for the corpus lattice 500 that maps hash codes to nodes. If a node corresponding to one of the hash values is identified, the existing node is added as a child of the matching corpus node. If not, a new node is created and added as a child of the matching corpus node. Additionally, the data set associated with the matching corpus node may be pushed to the child nodes and removed from the matching corpus node. Additionally, the matching corpus node is marked as expanded. The process flow then advances to block 612. If, at block 608, the matching corpus node is already expanded, block 610 may be skipped, and the process flow may advance directly to block 612.

At block 614, the next (or first) child of the node candidate is obtained. Process flow then advances to block 616, wherein the lattice building method 600 is executed for the child of the node candidate obtained at block 614. The execution of the lattice building method 600 may be recursive call, resulting in a recursive execution of the method 600, starting at block 602. Within the recursive execution, the child of the current node candidate serves as the new node candidate and the children of the matching corpus node serve as the new node set against which the new node candidate will be evaluated. Additionally, the matching corpus node may be identified as the corpus node added at 622 if the node candidate was not determined to match a corpus node 502 in the corpus lattice 500 at blocks 606 or 607. It will be appreciated that this recursive execution of the method 600 may result in successive levels of recursion depending on the number of layers of children in the URL lattice 300. After the lattice building method 600 executed at block 616 terminates, the process flow may advance to block 618.

At block 618, a determination is made regarding whether additional child nodes of the current node candidate are available. If there are more child nodes available, the method 600 may advance to block 614, which results in a new recursive execution of the method 600 at block 616 using the next child of the node candidate. If no additional children are available, the process flow may advance to block 620, wherein the process flow terminates. If the current iteration of the method 600 is a recursive iteration, then the termination of the method 600 results in the process flow returning to a previous iteration.

Returning to block 607, if the node candidate does not correspond with a corpus node in the corpus lattice 500, the process flow may advance to block 622. At block 622, a new node corresponding with the node candidate may be added to the corpus lattice 500. Adding the new node may include adding an entry into the corpus lattice's table of known nodes. The new node includes the hash code, the data set corresponding to the current URL, and information relating to all of the child nodes of the node candidate. Information relating to all of the child nodes of the node candidate may be tracked by keeping a reference to the node candidate, which can be dropped when the node is expanded. Additionally, the expansion state of the new node may be set to "unexpanded." The position of the new node in the corpus lattice 500 may depend on the level of recursion reached before adding the current node candidate as a new node. For example, if the current iteration of the method 600 is the first iteration, in which case there has not been a recursive call, the node candidate will correspond to the root node 312 of the URL lattice 300 and will be added as a new root node to the corpus lattice 500. If the current iteration of the method is a recursive iteration, the node candidate will be a child node relative to one of the URL nodes 302 in the URL lattice 300. Additionally, the matching corpus node in the previous level of recursion has been identified as the parent node of the current node candidate. The current node candidate will be added to the corpus lattice 500 as the child of the identified parent node, in which case, the parent node is updated to include a pointer identifying the child node. Process flow may then advance from block 622 to block 620.

It will be appreciated that the method 600 describes a method for merging a URL lattice 300 with the corpus lattice 500. After the method 600 has fully terminated, in other words, after any recursive calls have been resolved, the method 600 may be repeated with a new node candidate generated from a different URL. A new URL may be obtained and a new URL lattice 300 may be generated. The method 600 may then be restarted at block 602 with the root node of the 312 of the URL lattice as the next node candidate. The method 600 may be repeated until all URLs in the URL corpus have been processed. After all of the URLs in the URL corpus have been processed, a corpus lattice 500 has been generated, wherein the data set associated with each URL has been pushed to each of the corresponding child nodes. Further, each of the nodes has an expansion state of "expanded" or "unexpanded." After completing the lattice building process, the URL processor may proceed to the lattice pruning process, wherein a the corpus 500 lattice is pruned to remove children of corpus nodes 502 from the corpus lattice 500 if the children are compatible with each other and compatible with the parent node, based on the data sets associated with each corpus node 502.

Pruning the Corpus Lattice

Figure 7:
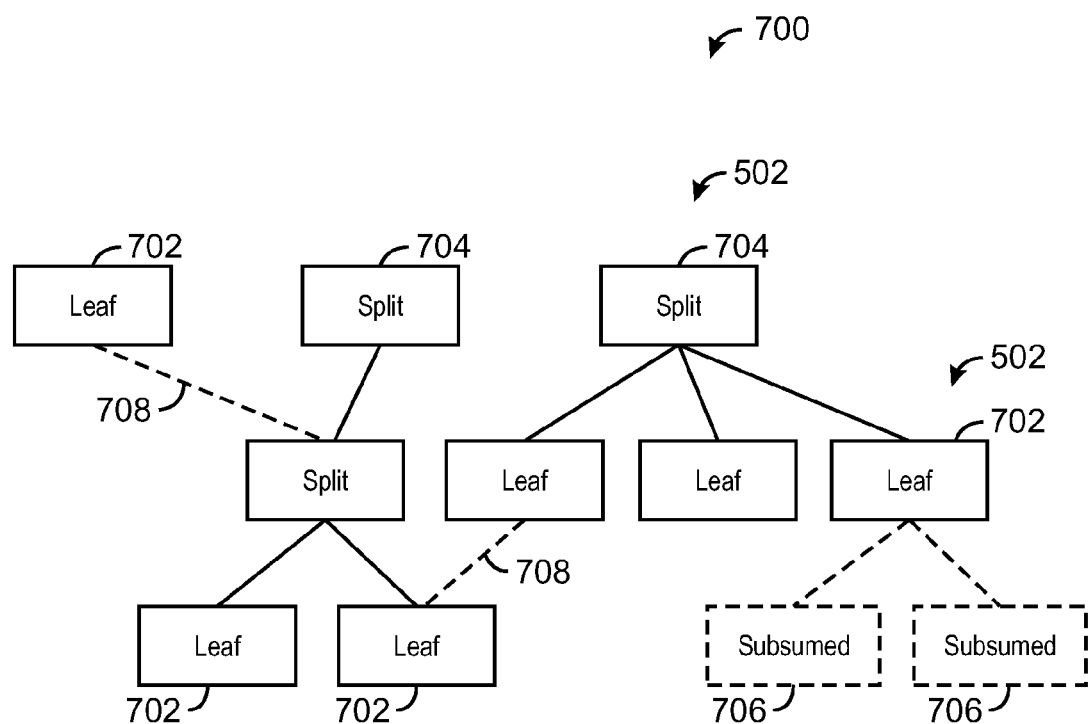
FIG. 7 is a diagram of a pruned corpus lattice, in accordance with embodiments of the present invention.

FIG. 7 is a diagram of a pruned corpus lattice, in accordance with embodiments of the present invention. The pruned corpus lattice may be referred to by the reference number 700, and represents a corpus lattice 500 wherein various corpus nodes 502 have been removed. Each corpus node 502 of the pruned corpus lattice 700 may have a node state of "Unprocessed," "Leaf," "Split," or "Subsumed," and may be referred to as unprocessed nodes, leaf nodes 702, split nodes 704, and subsumed nodes 706, respectively. Unprocessed nodes are corpus nodes that have not been visited during the pruning process and may be expanded nodes or unexpanded nodes. A fully-pruned corpus lattice 700 will not contain any unprocessed nodes. Subsumed nodes 706 are corpus nodes that have been removed from the corpus lattice 500 because it has been determined that the subsumed node 706 is compatible with at least one of the subsumed node's parent nodes and sibling nodes with respect to that parent node. In an embodiment, the expansion state and node state may be combined into a single state indicator, with the "unprocessed" state being removed and unprocessed nodes being indicated by having a state of "expanded" or "unexpanded". The data set associated with each of the subsumed nodes 706 may be included in the subsumed node's nearest parent node that has not been subsumed. Leaf nodes 704 are corpus nodes are that have not been subsumed and have no children, possibly because the node's children have been subsumed. Split nodes 704 are corpus nodes that have not been subsumed and also have children. In an embodiment, all of the data sets associated with the corresponding URLs may be included in the leaf nodes 702. In an embodiment, both split nodes 704 and leaf nodes 702 will have a data set. The content of the data sets may vary depending on the particular application, and are discussed further below in the sections entitled "Operations of the Monitor in the URL Recognizer Use Case" and "Operations of the Monitor in the URL Case Building Use Case." In an embodiment, each child node in the pruned corpus lattice 700 will have a single parent. Accordingly, some links between nodes of the corpus lattice 500 may be eliminated, as shown by dotted lines 708.

Figure 8A:
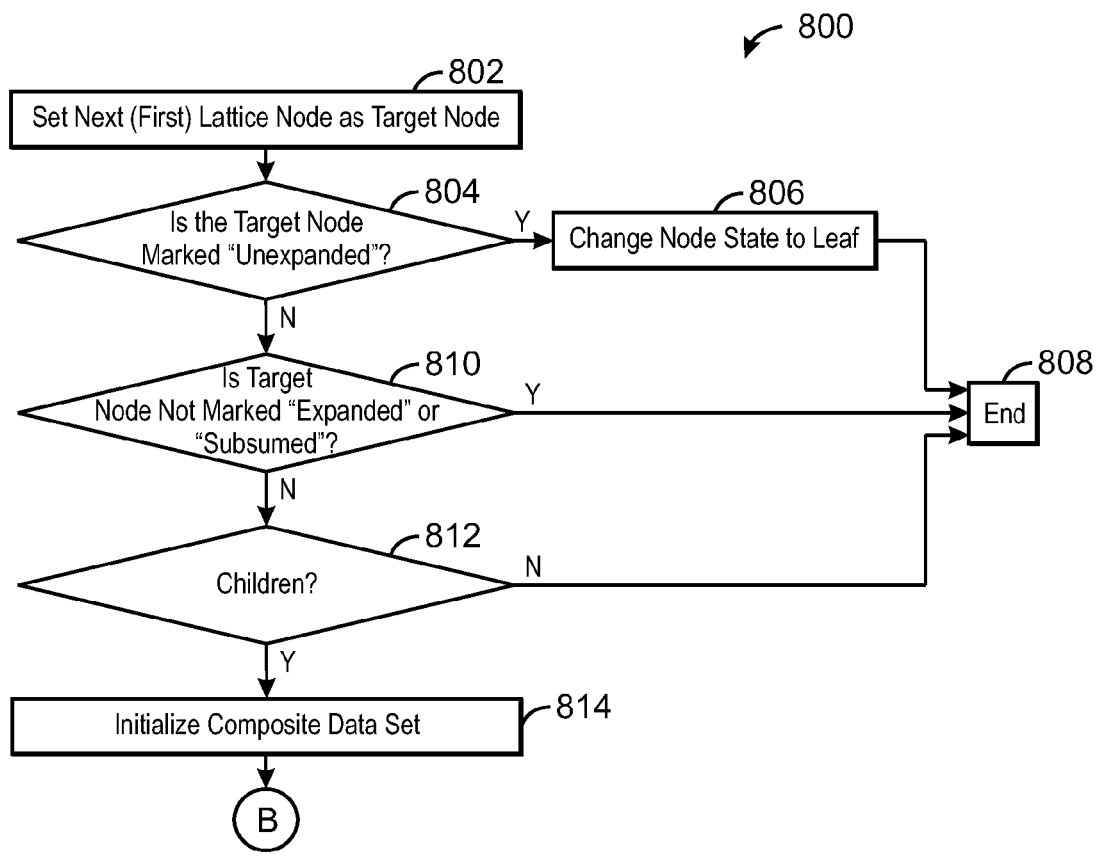
FIGS. 8A, 8B, and 8C are process flow diagrams of a method of pruning a corpus lattice, in accordance with embodiments of the present invention.
Figure 8B:
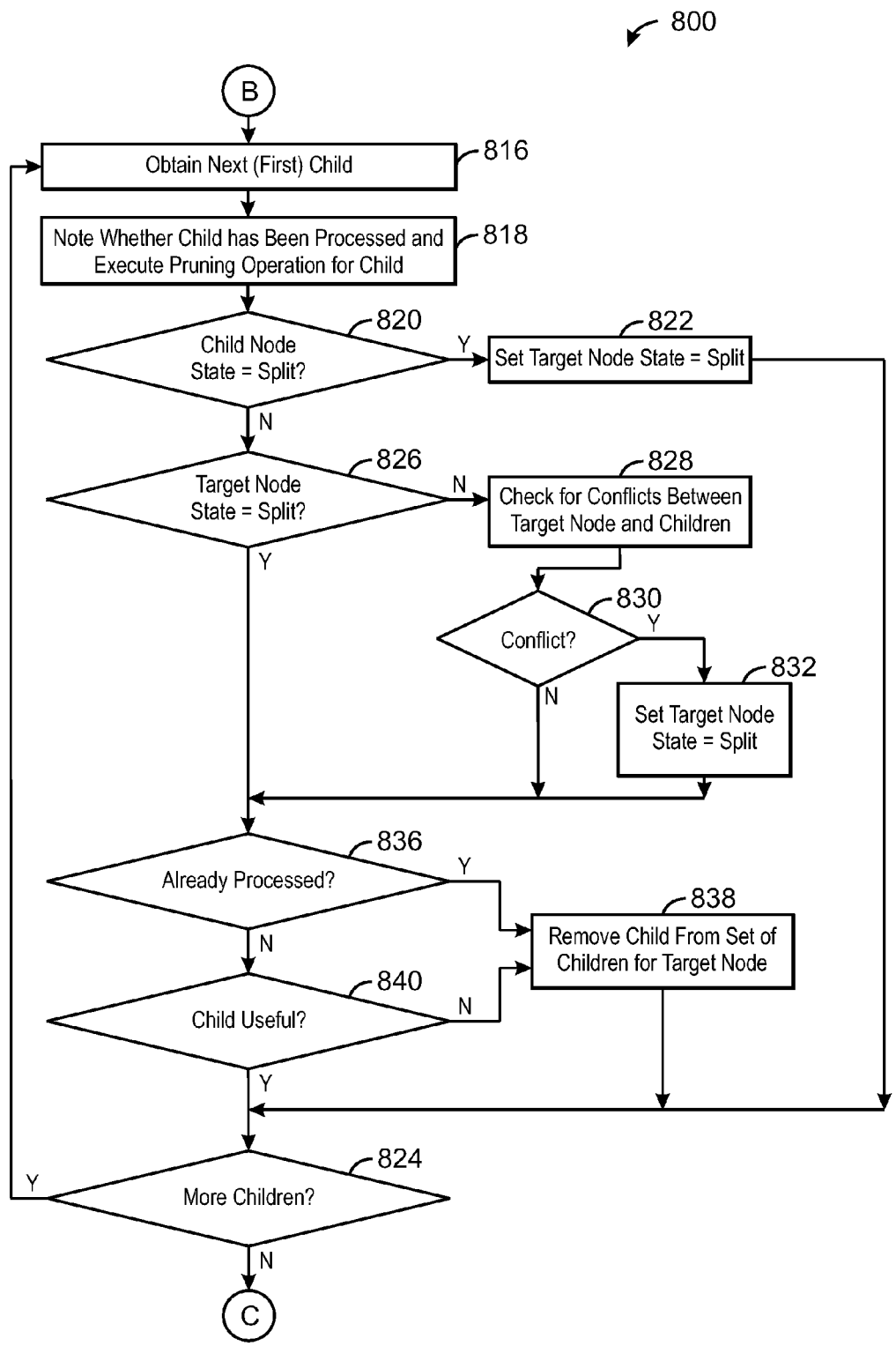
Figure 8C:
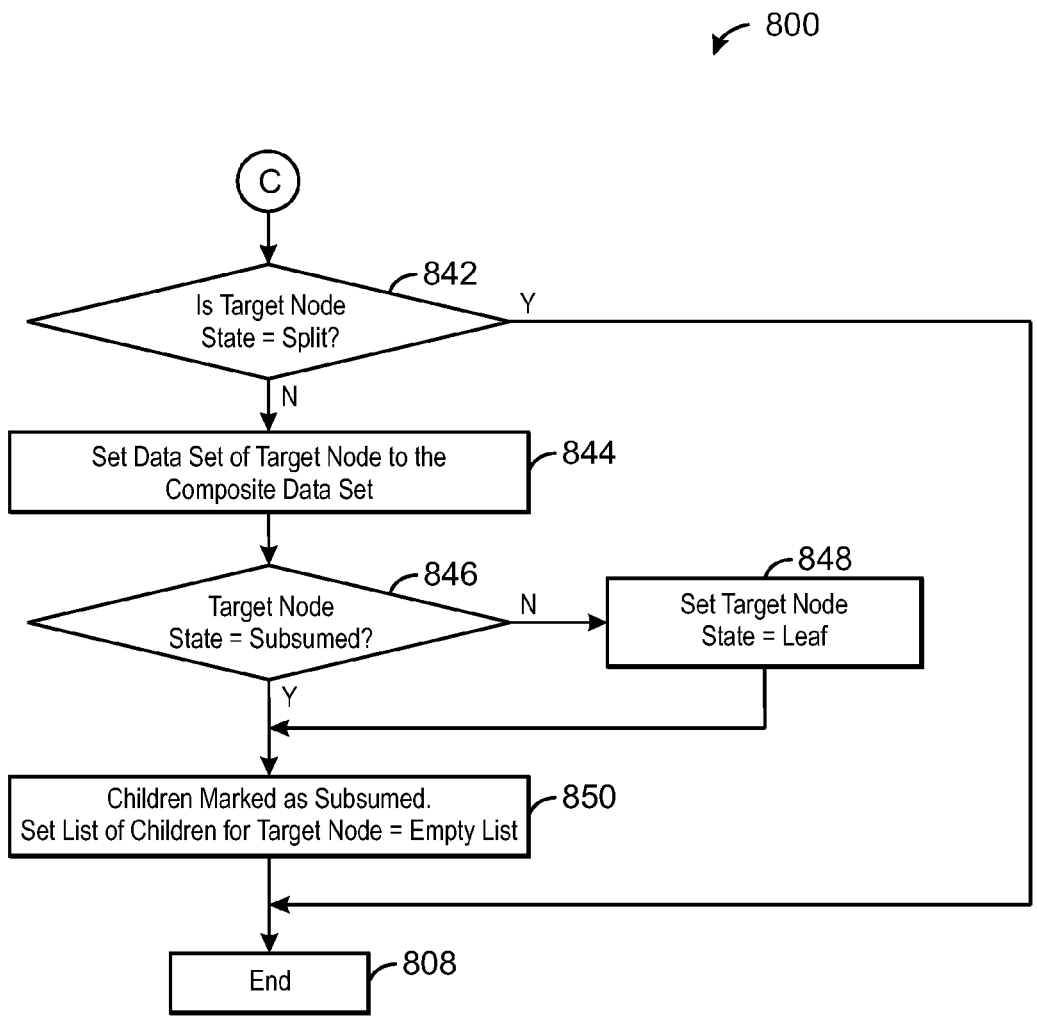

FIGS. 8A, 8B, and 8C are process flow diagrams of a method of pruning a corpus lattice, in accordance with embodiments of the present invention. The method is referred to with the reference number 800, and may be executed by the URL processor 134 during the lattice pruning process to remove children of corpus nodes 502 from the corpus lattice 500, if the children are compatible with each other and compatible with the parent node. The method 800 may operate on the corpus lattice 500 generated by method 600. As will be described further below, the method 800 may be recursive, in other words, the method 800 may be iterated recursively for child nodes of the corpus lattice 500.

The method 800 may begin at block 802, wherein the next corpus node 502 of the corpus lattice 500 is identified as the target node. During the first iteration of the method 800, in other words, an iteration not resulting from a recursive call, the target node may be a root node 504 of the corpus lattice 500.

At block 804, a determination is made regarding whether the target node is an unprocessed node with an expansion state of "unexpanded." If the target node is unprocessed and unexpanded, the process flow may advance to block 806. At block 806, the node is changed to a leaf node 702 (FIG. 7) and the node's unexpanded children are marked as "subsumed." The process flow may then advance to block 808, wherein the process flow terminates. If the current iteration of the method 800 is a recursive iteration, then the termination of the process flow at block 808 results in the process flow returning to a previous iteration. If, at block 804, the target node is not an unprocessed node or the target node's expansion state is not "unexpanded," the process flow may advance to block 810.

At block 810 a determination is made regarding whether the target node is either an unprocessed node or a subsumed node 706. If the target node has not been marked as unprocessed or subsumed, this may indicate the target node has already been pruned along another path, and the process flow may advance to block 808, wherein the process flow terminates. If the target node has been marked as either unprocessed or subsumed, the process flow may advance to block 812.

At block 812, a determination is made regarding whether the target node has children. If the target node does not have any children, the process flow may advance to block 808. Otherwise, if the target node does have children, the process flow may advance to block 814. In an embodiment, the process flow advances to block 808 only if the childless target node is a subsumed node.

At block 814, a composite data set may be may be initialized to the target node's data set. The composite data set will be used by the monitor at block 828 to determine whether the child nodes of the target node are compatible with one another and with the parent target node. The process flow may then advance to block 816, as shown in FIG. 8B.

FIG. 8B is a block diagram showing a continuation of method 800. At block 816, the next, or first, child node corresponding to the target node may be obtained. At block 818, it is recorded whether the child node is an unexpanded node. The pruning method 800 may then be executed for the child node, which results in a recursive execution of the method 800, starting at block 802. Within the recursive execution, the child of the target node serves as the new target node. It will be appreciated that this recursive execution of the method 800 may result in successive levels of recursion depending on the number of layers of children in the corpus lattice 500. After the lattice building method 800 executed at block 818 terminates, the process flow may advance to block 820.

At block 820, a determination is made regarding whether the child node has a node state of "split," which may have been set during the recursive execution of the pruning method for the current child node. If the node state of the child node is "split," the process flow advances to block 822, wherein the node state of the target node is also set to split. The process flow may then advance to block 824. If, at block 820, the node state of the child node is not "split," the process flow may advance to block 826.

At block 826, a determination is made regarding whether the node state of the target node is "split." If the target node is split, the process flow may advance to block 836. If the target node is not split, the process flow may advance to block 828.

At block 828, the URL processor 134 checks for conflicts between the child node, the target node, and the target node's other children. The check for conflicts may be performed by the monitor by comparing the child node's data set to the composite data set generated at block 814. Further, the criteria employed by the monitor for determining the conflict may vary based on a decision procedure specific to the particular application. At block 828, the composite data set may be modified based on the data set of the child node. In an embodiment, the monitor may check for conflicts in conjunction with modifying the composite data set based on the child node's data set.

In an embodiment, the existence of a conflict may be determined based on the field states corresponding with each node, as discussed further below in the section entitled "entitled "Operations of the Monitor in the URL Recognizer Use Case." The criteria employed by the monitor for determining conflict between nodes in a case-generating embodiment is described further in relation to FIG. 10 under the section entitled "Operations of the Monitor in the URL Case Building Use Case."

At block 830 a determination is made regarding whether a conflict was detected at block 828. If a conflict was detected, the process flow may advance to block 832. At block 832, the node state of the target node is set to "split." In embodiments, the data set of the target node will no longer be used and is set to an empty data set at block 832. The process flow may then advance to block 836. If a conflict is not detected, the process flow may advance to block 836 directly, skipping block 832.

Furthermore, in embodiments, split nodes can have an associated data set that represents the consensus of the child nodes that are compatible with one another. In such embodiments, the compatible children may be removed as children at block 838 and marked as subsumed at block 850, while the incompatible children may be retained as children or otherwise split off from the target node. Thus, at block 828 the child nodes may be partitioned into a list of incompatible children, which may become leaf nodes, and a list of consensus children, which represent those nodes that will be subsumed into the target node.

In an embodiment wherein split nodes can have an associated data set, the monitor may employ various processes to identify the consensus children and the incompatible children. In one exemplary embodiment, the monitor executes a single pass over all of the children of the target node to determine whether all of the children are compatible with one another and with the target node. If an incompatibility is found the monitor may then identify the consensus children and the incompatible children. The monitor may determine a pairwise similarity between each pair of children and analyze the two most similar children. If the two most similar children are not sufficiently similar as measured by comparing the similarity with some threshold, then the monitor performs a full split among the children and the target node becomes a split node with no associated data set. Otherwise, if the two most similar children are sufficiently similar, the monitor identifies the two children as consensus children and combines each of these child node's data into the consensus data associated with the split node. The remaining children may be processed to identify the child node determined by the monitor to be the next most compatible child node. If this child is sufficiently compatible, the monitor may remove the child node from the list of children and modify the consensus data to take the child's data into account. The process may be repeated until there is no sufficiently compatible child left.

At block 836, a determination is made regarding whether the child node had already been processed, as was recorded at block 818. If the child node was previously processed, this may indicate that the child node will show up in the output as a child of a different parent node somewhere else in the corpus lattice 500. Thus the child node may be eliminated from the set of children of the current target node, and the process flow may advance to block 838. At block 838, the child node is removed from the set of children of the target node by deleting the link between the target node and the child node as shown by link 708 (FIG. 7). In addition, if the target node is not a split node 704 and the child node is not a subsumed node 706, the child node may be added to a list of "preserved children". The process flow may then advance to block 824. If, at block 836, the child node was not previously processed, the process flow may advance to block 840.

At block 840, if the node state of the child node is a leaf node 702, a determination is made regarding whether the child node is useful. In an embodiment, this determination is made by the monitor according to a problem-specific decision procedure. If the child if not considered useful, the process flow may advance to block 838, wherein the child is removed from the set of children for the target node. From block 838 or block 840, the process flow may advance to block 824, where a determination is made regarding whether the target node has additional children. If the target node has additional children the process flow may return to block 816, wherein the next child will be obtained and processed, as described above. If, at block 824, there are no remaining child nodes to be processed, the process flow may advance to block 842, as shown in FIG. 8C.

Furthermore, as discussed in relation to block 832, in embodiments, split nodes can have an associated data set that represents the consensus of the child nodes that are compatible with one another. In such embodiments, those children that are identified as consensus children at block 828 may be removed from the set of children for the target node at block 838. For those children identified as incompatible children, blocks 836, 838, and 840 may be skipped and the children may be kept as children of the target node.

FIG. 8C is a block diagram showing a continuation of method 800. At block 842, a determination is made regarding whether the node state of the target node is set to split. If the target node is split, the process flow advances to block 808, and the method 800 terminates. For purposes of clarity, block 808 is shown in both FIGS. 8A and 8C. If, at block 842, the target node is not split, the process flow may advance to block 844. At block 844, the data set of the target node is set to the composite data set that was generated at block 814 (FIG. 8A). In an embodiment, the data set of the target node is set to a compact representation of the composite data set.

At block 846, a determination is made regarding whether the node state of the target node has been set to "subsumed." If the target node is not subsumed, the process flow may advance to block 848, wherein the node state of the target node is set to "leaf." The process flow then advance to block 850. If, at block 846, the target node is subsumed, the process flow may advance to block 850. At block 850, the children of the target node and any nodes in the set of preserved children are converted to subsumed nodes 706 as described below and the link between the target node and its children is removed by setting the list of children for the target node to an empty list. The process flow then advances to block 808 and the process flow terminates.

A corpus node 502 is converted to a subsumed node 706 by the following process. First, the corpus node's node state is changed to "subsumed". Next, if the corpus node has children, each of its child nodes is converted to a subsumed node 706 by a recursive application of this process. If the corpus node was an unexpanded unprocessed node, an iterative subprocess is performed along each dimension of specificity (e.g., host and path). The hash code for the node that would correspond to the node's host extension is computed and the process checks to see whether a node corresponding to that hash code is in the corpus lattice 500. If so, that node is converted to a subsumed node. If not, the subprocess repeats with the hash code that would correspond to the host extension's host extension, terminating either when a node is found in the corpus lattice 500 or when no further host extension can be computed. The same subprocess is then repeated for the path extension (and its path extension, etc.).

As noted above, the termination of the process flow at block 808 may terminate a recursive iteration of the method 800, in which case, the termination of process flow will cause the previous level of recursion to continue processing. After the method 800 has fully terminated, in other words, after any recursive calls have been resolved, the method 800 may be restarted at block 802 with a new root node 504 of the corpus lattice 500 used as the next target node. The method 800 may be repeated until all the root nodes 504 have been processed. After all of the root nodes 504 have been processed, a pruned corpus lattice 700 has been generated. The corpus nodes 502 of the pruned corpus lattice 500 will be leaf nodes 702, split nodes 704, or subsumed nodes 706, depending on the resulting node state of each corpus node 502. After completing the lattice pruning process, the URL processor 134 may proceed to the output process, wherein the pruned corpus lattice 700 is used to generate an output such as one or more data tables used by a URL recognizer or one or more cases.

Generating an Output Data structure from the Corpus URL

Figure 9:
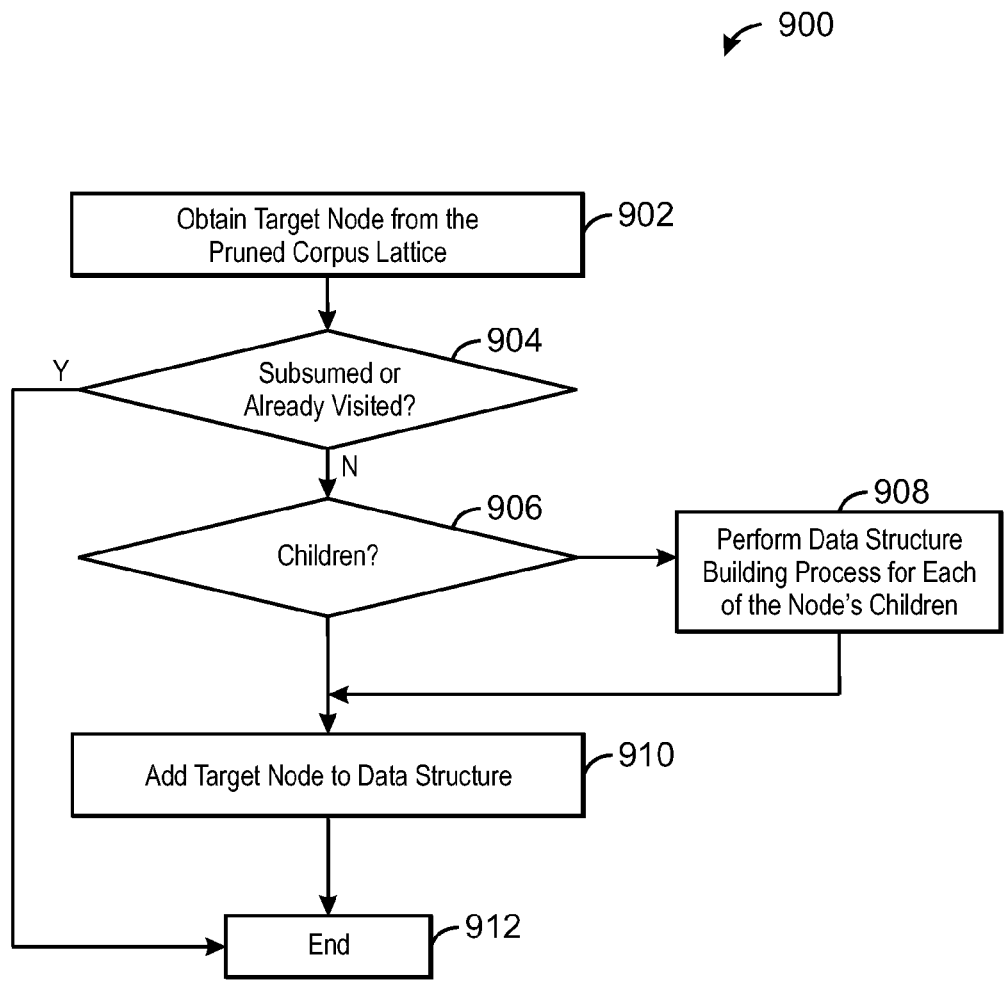
FIG. 9 is a process flow diagram of a method of generating an output based on the pruned corpus lattice, in accordance with embodiments of the present invention.

FIG. 9 is a process flow diagram of a method of generating an output based on the pruned corpus lattice 700, in accordance with embodiments of the present invention. The method is referred to with the reference number 900, and may be executed by the URL processor 134 during the output process, wherein an output data structure may be generated from the pruned corpus lattice 700. As will be described further below, the method 900 may be recursive, in other words, the method 900 may be iterated recursively for child nodes of the pruned corpus lattice 700.

The method may begin at block 902, wherein a corpus node 502 is obtained from the pruned corpus lattice 700. In the first iteration of the method the corpus node 502 obtained will be a root node of the pruned corpus lattice 700. The corpus node 502 obtained may be referred to herein as the target corpus node 502. During the processing of the pruned corpus lattice 700 it may be possible to visit a child node through more than one path. To avoid processing child nodes more than once, a record may be kept that indicates whether a child has already been visited during the execution of the method 900.

At block 902, a determination is made regarding whether the target corpus node 502 is a subsumed node or has already been visited. If the target corpus node 502 is not subsumed and has not been marked as having already been visited, the process flow may advance to block 906.

At block 906, a determination is made regarding whether the target corpus node 502 has any children. If the target corpus node 502 does have one or more children, the process flow may advance to block 908. At block 908 the output generation method 900 is executed for each of the target corpus node's children, which results in a recursive execution of the method 900, starting at block 902. Within the recursive execution, the child of the target corpus node 502 serves as the new target corpus node 502. It will be appreciated that this recursive execution of the method 900 may result in successive levels of recursion depending on the number of layers of children in the pruned corpus lattice 700. After the recursive iterations of the output generating method 900 terminate, the process flow may advance to block 910. If, at block 906, the target corpus node 502 does not have any children, the process flow may skip block 908 and advance directly to block 910.

At block 910, information relating to the target corpus node 502 may be added to the output data structure being generated. The information may be determined based the target corpus node's 502 associated URL pattern and/or data set. The form of the data structure may vary depending on the particular application. In an embodiment, the data structure may be a set of URL recognizer information tables, including one or more of a pattern table, a data table, a guard table, and a guard state table, as described further below in the section entitled "Operations of the Monitor in the URL Recognizer Use Case." In an embodiment, the data structure may be a group of URL cases, described further below in the section entitled "Operations of the Monitor in the URL Case Building Use Case."

After adding the target corpus node 502 to the data structure being built, the process flow may advance to block 912, wherein the process flow terminates. As noted above, method 900 may be recursive. Thus, the termination of the process flow at block 912 may terminate a recursive iteration of the method 900, in which case, the termination of process flow will cause the previous level of recursion to continue processing. It will be appreciated that the process flow described above results in a post-order walk of the pruned corpus lattice 700, wherein child nodes are added to the data structure before parent nodes. In an embodiment, the data structure may be built using a pre-order walk of the pruned corpus lattice, wherein parent nodes are added to the data structure before child nodes. After the method 900 has fully terminated, in other words, after any recursive calls have been resolved, the method 900 may be restarted at block 902 with a new root node of the pruned corpus lattice 700 used as the target corpus node 502. The method 800 may be repeated until all the root nodes of the pruned corpus 700 have been processed.

Operations of the Monitor in the URL Recognizer Use Case

Embodiments of the present invention provide a URL processing technique useful for processing a plurality of URLs to generate a set of URL recognizer information tables for use by a URL recognizer. Generally, a URL recognizer is computer-implemented tool that can process URLs to extract the useful information contained therein. For example, the URL recognizer may tag the URLs as belonging to particular category or identify search terms in the query URL, which may be used to provide various metrics regarding Internet activity across a range of users and Websites or the interests of a single user. Techniques for using search terms extracted from query URLs to generate such metrics are discussed further in the commonly assigned U.S. patent application Ser. No. 12/618, 151, filed on Nov. 13, 2009, entitled "Method and System for Processing Web Activity Data," by George Forman, et al., which is hereby incorporated by reference as though fully set forth in its entirety herein.

The URL recognizer may include, or at least have access to, one or more information tables, which may be used by the URL recognizer to identify the useful information contained in the URL. The URL recognizer may process a newly encountered URL by using the new URL to search the information tables. Techniques for using a URL recognizer to extract useful information from a newly encountered URL are discussed further in the co-pending and commonly assigned U.S. patent application Ser. No. 12/842,434, filed on Jul. 23, 2010, entitled "Method and System for Processing a Uniform Resource Locator," by Evan Kirshenbaum, which is hereby incorporated by reference as though fully set forth in its entirety herein.

The techniques described herein may be used to generate the information tables used by a URL recognizer. Specifically, during the generation of the corpus lattice as described in relation to FIGS. 5 and 6, each corpus node 502 of the corpus lattice 500 may be associated with a data set, referred to herein as a field set. The field set may include a field state indictor for each data field in the query field of the corresponding URLs that relate to the corpus node. The field states may represent some characterization of the corresponding data field, such as a confidence level regarding whether the data field is of a particular target class, such as a search term.

The field set may be generated during the generation of the URL lattice 300 as described in relation to FIGS. 3 and 4. Each entry of the field set may correspond to a particular data field of the corresponding URL, and may include a data field name and a data field indicator that indicates the likelihood that the data field is of the target class. In an embodiment, the field set is generated through the use of a URL classifier. Using the URL classifier, each data field of the URL corresponding to the URL lattice 300 can be assigned an indicator that indicates the likelihood that the data field is of the target class. For example, the classifier may score the data fields of the URL as being "strong positive," "weak positive, "weak negative," or "strong negative." An indication of "strong positive" indicates a high degree of likelihood that the corresponding data field is of the target class. An indication of "weak positive" indicates a lower degree of likelihood that the corresponding data field is of the target class. An indication of "strong negative" indicates a high degree of likelihood that the corresponding data field is not of the target class. An indication of "weak negative" indicates a lower degree of likelihood that the corresponding data field is not of the target class. For example, if the degree of likelihood that the corresponding data field is of the target class is computed by the classifier as a percentage, strong positive may correspond with approximately 69% or more, weak positive may correspond with approximately 50% to 69%, weak negative may correspond with approximately 20% to 49%, and strong negative may correspond with approximately 19% or less. The percentages indicated above are merely exemplary. Any appropriate percentages may be used for breaking the classification into segments. Those data fields scored as "strong negative" may be ignored, while the remaining data fields may be stored to the field set 310 along with the corresponding indicator.

As discussed above, during the generation of the corpus lattice, the URL lattice 300 is used to generate node candidates which may be added to the corpus lattice 500. When a node candidate is added to the corpus lattice 500, the field set corresponding to the node candidate becomes the data set corresponding to the corpus node 502. The field set may be used during the pruning of the corpus lattice described in relation to FIGS. 8A, 8B, and 8C.

As discussed above, the lattice pruning process described in reference to FIGS. 8A, 8B, and 8C functions to remove children of corpus nodes 502 from the corpus lattice 500 if the children are compatible with each other and compatible with the parent node, in other words, the data sets associated with the parent node and child nodes do not conflict. In an embodiment for generating URL recognizer tables, the existence of a conflict, determined by the monitor at block 828 (FIG. 8B), may be based on the field states corresponding with each node. A conflict may be detected if a data field in one data set has been identified as "strong positive" and a data field in the other data set with the same field name has been identified as a "strong negative." If no conflict is detected, the child nodes of the parent node may be subsumed and the field set of the child nodes merged into the field set of the parent node. The resulting merged field set becomes the composite data set, which is referred to in block 814 (FIG. 8A).

During the generation of the composite data set discussed above at block 814 of FIG. 8A, the field set of the target node may be merged with the field sets of the target node's direct children. In such an embodiment, the data set of the target node may be referred to as a consensus field state, and represents the combined field states of the target node and all of the target node's children that have been subsumed. When the field set of the child node is merged into the consensus field set of the target node, the field states of the target node and child node may be compared and refined. For example, if either the target node or child node includes a data field with a field state of "weak positive" and the same data field in the other node has a field state of "strong positive," the consensus field state for the data field may be set to "strong positive" to reflect the increased confidence that the named data field is of the target class. Conversely, if the one node includes a data field with a field state of "weak positive" and the same data field in the other node has a field state of "strong negative," the consensus field state for the data field may be set to "strong negative" to reflect the increased confidence that the named data field is not of the target class. If the field set of the child node includes a data field with a particular name but the consensus field set does not include a data field with the same name, the data field and field state from the child node may be added to the consensus field set.

As discussed above in relation to FIG. 9, the pruned corpus lattice may be used by the URL processor 134 to generate an output, in this case, a set of URL recognizer data tables. The URL recognizer data tables may be used by a URL recognizer to identify newly encountered URLs and extract the useful information contained therein. The data tables incorporate the URL patterns represented by each of the corpus nodes and the field states associated with the URL patterns such that newly encountered URLs can be evaluated based, in part, on the field states. During the operation of the URL recognizer a new URL lattice may be generated for the newly encountered URL, as described in relation to FIGS. 3 and 4. Each node of the new URL lattice may be referred to herein as a "search node" and may be used to search the pattern tables to extract the useful information.

The URL recognizer data tables may include a pattern table, which may be used by the URL recognizer to determine whether the URL recognizer has any information pertaining to the newly encountered URL. Each entry in the pattern table may be referred to herein as a "pattern of interest," and may include a hash code corresponding to the host and path combination of one of the corpus nodes 502 in the pruned corpus lattice 700. The data table may be used to provide the useful information known about the newly encountered URLs. For example, the data tables may include information that identifies whether a particular data field of a query URL is of a target class, such as a search term field.

During the generation of the URL recognizer tables, data corresponding to each of the corpus nodes 502 of the pruned corpus lattice 700 may be added to the URL data tables at block 908 as discussed above in reference to FIG. 9. More specifically, the node state of the corpus node 502 may be used to determine how the data corresponding to the corpus node 602 should be stored in the URL data tables.

In an embodiment, if the current node is a leaf node, this indicates that the node includes a field set. If the field set contains any data fields marked as "strong positive" or "weak positive", the hash code of the leaf node may be added to the pattern table. Further, any data fields in the field set may be added to the data table, such that each data table entry is linked to the corresponding pattern table entry. In an embodiment, the data fields marked as "strong positive" or "weak positive" may be added to the data table by generating a combined hash code corresponding to the URL node and the data field name. For example, the hash code of the URL node 302 may be shifted or rotated and added to the hash code corresponding to the data field name. The combined hash code may be added as a data field entry corresponding to the pattern table entry.

The URL data tables may also include a guard state table, used to improve the efficiency with which the URL recognizer searches the URL recognizer data tables. In an embodiment, if the current corpus node 502 is a split node 704 the hash code of the split node 704 may also be added to the guard state table. During the operation of the URL recognizer, the guard state table may be used to indicate whether the host and path combination represented by the search node is a pattern of interest, and whether a pattern of interest may exist for a child of the search node. In other words, the guard state entry can serve as an indication of whether other URL nodes 302 obtained by recursively extending the search node may be patterns of interest. In an embodiment, split nodes 704 may also include a corresponding field set, which may occur if the field set data conflicts with a field set of one or more of the children of the split node. If the split node 704 includes a field set, the hash code of the split node 704 may be added to the pattern table, and the field set corresponding to the split node 704 may be added to the data table, as discussed above.

In an embodiment, the URL data tables may also include a guard table may be used to increase the efficiency with which the URL recognizer searches the URL recognizer data tables. In an embodiment, if the current corpus node 502 is a root node, the hash code corresponding to the current corpus node 502 may be added to the guard table. During the operation of the URL recognizer, the URL recognizer may search for a matching entry in the guard table for the root node of the new URL lattice 302 before looking for a match in the pattern table. In an embodiment, the root nodes may be added to both the guard table and the pattern table. In an embodiment, root nodes may be added only to the guard table, and data associated with the root nodes may be added to a guard data table. Operations of the Monitor in the URL Case Building Use Case Embodiments of the present invention provide a URL processing technique useful for processing a plurality of URLs to generate a set of URL cases, which may be used by at training system to develop a URL classifier. Generally, a training system of generating a URL classifier may operate on a collection of raw electronic data such as URLs obtained for a plurality of online entities and users. The raw URL data may be used by a training system to develop a classifier for identifying a target class within the data. Selected portions of the raw data may be presented by the training system to a trainer that provides input to the training system regarding whether an identified data field contains data of the target class. The input from the trainer may be used by the training system to develop the classifier.

Furthermore, the raw data used for developing the classifier may be divided into portions, referred to herein as "cases," that share some common characteristic, such as a common data structure or a common source, for example. The training system may present an entire case of data to the trainer for evaluation rather than just one example of the data field. Thus, different examples of the same data field may be available to the trainer in the context of an entire case, which may enable the trainer to more readily identify patterns that reveal the usage of the data field and lead to a more accurate labeling of the data field. Techniques for generating a classifier are discussed further in the commonly assigned U.S. patent application Ser. No. 12/618,159, filed on Nov. 13, 2009, entitled "Method and System for Developing a Classification Tool," by Evan R. Kirshenbaum, et al., which is hereby incorporated by reference as though fully set forth in its entirety herein. Techniques for generating the cases to be used by the training system are described with reference to FIG. 10.

Figure 10:
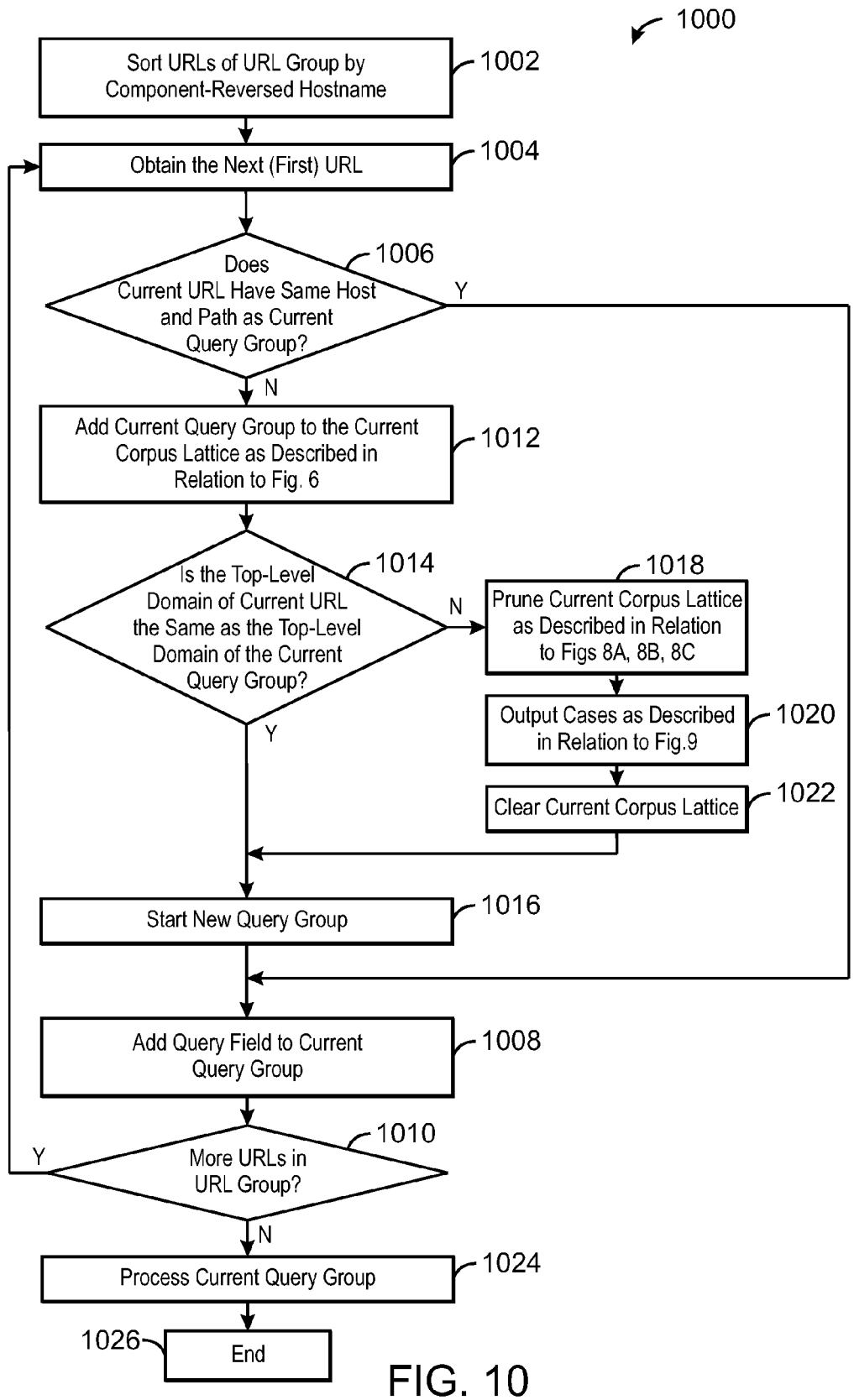
FIG. 10 is a process flow diagram of a method of generating cases, in accordance with embodiments of the present invention.

FIG. 10 is a process flow diagram of a method of generating cases, in accordance with embodiments of the present invention. The method is referred to with the reference number 1000, and describes a technique wherein cases are generated using the methods described above. The method 1000 includes a lattice building process, a pruning process and an output process. In an embodiment, a query group is generated for a group of URLs having the same host and path. The query group may include a combined data set that merges together the query fields of the URLs with the same host and path. In an embodiment, the query group may include a random sampling of query fields encountered in the URLs of the query group. As used herein, the term "keyword" refers to the data field name of a data field in the query field of the URL, and the term "value" refers to the corresponding data field value. The combined data set of the query group can include a table of field counts corresponding to the number of times that each keyword in the combined data set appears in the URLs corresponding to the query group. The combined data set of the query group may also include a URL count corresponding to the number of URLs that have been incorporated into the query group. The combined data set of the query group may be used as the data set of the corresponding corpus nodes 502 during the lattice building process, pruning process, and output process described above.

The method may begin at block 1002, wherein the URLs of a URL corpus may be sorted by component-reversed host name. A component-reversed host name may be generated by reversing the order of the components of the host name. For example, generating a component-reversed host name for "mail.yahoo.com" would yield "com.yahoo.mail". The URLs of the URL corpus may then be sorted alphabetically according to the component reversed host name. In this way, URLs with from same host will be grouped together in the sorted group of URLs.

At block 1004, the next, or a first, URL may be obtained from the sorted group of URLs. The URL may be split into host, path, and query field. Various checks may be performed to ensure that URL is useful. For example, if the URL is a numeric IP address, or includes syntax errors, the URL may be dropped, and the next URL in the sorted group of URLs may be obtained. If the URL is kept, the host name may be reversed to return it to its original form.

At block 1006, a determination is made regarding whether the current URL has the same host and path as the query group that is currently being generated. If the current URL has the same host and path as the current query group, the process flow may advance to block 1008.

At block 1008, the query field of the URL may be added to the data set of the current query group. Additionally, the URL count for the query group may also be incremented by one. To add the query field to the data set of the query group, the query field is parsed into keyword/value pairs of the form "kwd=value". Each keyword/value pair may be parsed into separate keyword and value strings. If the keyword is new to the query group, the field count corresponding to the keyword may be set to one. Otherwise, the field count corresponding to the keyword may be incremented by one.

In an embodiment, the number of query fields added to the query group may be limited by generating a random sample of field/value pairs encountered for URLs with the same host and path combination. To generate the random sample, a capacity may be specified which determines the maximum number of query fields that may be included in the query group. When adding a query field to the query group, if the current number of query fields in the query group is less than the capacity, the query field is added to the end of a list of query fields in the query group. However, if the current number of query fields in the query group exceeds the capacity, the query field may be selectively added to the query group, each added query field replacing an existing query field. In an embodiment, a random integer, i, is generated within a range of 0 to n-1, where n equals the current number of URLs in the query current query group, including the URL being added. If the random integer is less than the capacity, the current query field is added at the $i^{th}$ slot in the list of query fields, and the old query field at the $i^{th}$ slot is discarded. Otherwise, if the random integer is greater or equal to than the capacity, the current query field is discarded. The process flow may then advance to block 1010.

At block 1010, a determination is made regarding whether additional URLs are available in the URL corpus. If more URLs are available, the process flow may advance to block 1004, and the next URL is obtained. If no more URLs were available, the process flow advances to block 1024 wherein the current query group is processed. Thus, the current query group is added to the corpus lattice as described at block 1012, the resulting corpus lattice is pruned as described at block 1018, and cases are output as described at block 1020. At block 1026, the process flow terminates.

Returning to block 1006, if the current URL does not have the same host and path as the current query group, the process flow advances from block 1006 to block 1012. At block 1012, the current query group may be added to the corpus lattice 500 (FIG. 5) as described in relation to FIG. 6. Before adding the current query group one or more checks may be performed to limit the growth of the corpus lattice 500. For example, if the length of the path of the query group is greater than a threshold length, the query group may be dropped rather than adding it to the corpus lattice 500. In an embodiment, the threshold length may be approximately 10 path components. In an embodiment, the number of query groups added to the current corpus lattice 500 may be tracked. If the number of query groups previously added exceeds a specified lattice size threshold and the number of URLs in the current query group is less than a specified query group size threshold, the current query group may be dropped with a specified probability rather than adding the current query group to the corpus lattice 500. For example, the lattice size threshold may be approximately 15,000 query groups, the query group size threshold may be approximately 100, and the probability may be 99 percent.

If, after performing the checks above, the current query group is added to the corpus lattice 500, a URL lattice 300 (FIG. 3) may be generated as described above in relation to FIGS. 3 and 4 based on the host and path of the current query group. The current query group is referred to herein as a "primitive" query group. Each URL node 302 of the resulting URL lattice 300 may serve as a node candidate, which may be added to the corpus lattice 500. When a URL node 302 corresponding to the current query group is added to the corpus lattice 500, the field/value pairs and field counts of the query group may be stored to the data set of the new corpus node 502. When a corpus node 502 is added to the corpus lattice 500 as a child of an existing corpus node 502, the primitive query group may be added to the data set of the parent node, which contains a set of such primitive query groups, with each such primitive query group being represented once. The data set of the parent node is referred to herein as a "composite" query group. Within a composite query group, the field counts and URL counts may be computed when required by summing the values from the contained primitive query groups. Also, within a query group, the set of query fields may be a random combination of the sets of query fields of the contained primitive query groups. In an embodiment, such computed values may be cached and the cached values used in the future as long as new primitive query groups have not been added to the set of primitive query groups in the composite query group. In this way, the composite query groups of parent nodes may include the query fields and field counts of the corresponding parent node as well as the query fields and field counts of the parent node's children.

At block 1014, a determination is made regarding whether the top-level domain of the current URL is the same as the top-level domain of the current query group. If the top-level domain of the current URL is the same as the top-level domain of the current query group, then the URL processor 134 continues building the same corpus lattice 500, and the process may advance to block 1016. In an embodiment, a criterion other than having the same top-level domain may be used to determine whether to begin another corpus lattice. For example, when the URLs in the corpus all come from the same company the check may be whether the URLs come from servers in the same geographic region. For other forms of resource identifier other criteria will be appropriate. The selection of criteria may be made to balance the amount of resources consumed against the ability to generate broad-ranging cases. In an embodiment, block 1014 is omitted and only a single corpus lattice is constructed.

At block 1016 a new query group is started. The previous query group may be cleared or initialized and prepared for receiving new data. The process flow may then advance to block 1008, wherein the field/value pairs included in the query field of the current URL are added to the current query group, as described above.

Returning to block 1014, if the top-level domain of the current URL is not the same as the top-level domain of the current query group, the URL processor is finished building the current corpus lattice 500, and the process flow may advance to block 1018.

At block 1018, the current corpus lattice 500 is pruned according to method 800, as described in relation to FIGS. 8A, 8B, and 8C. As discussed in relation to method 800, the node state of the corpus nodes 502 may be determined based on whether the data sets of the corpus nodes 502 conflict. For example, a corpus node 502 may be subsumed if the corpus node 502 is compatible with its parent and the parent's other children. During the check for conflicts performed by the monitor at block 828 of method 800, the criteria for determining conflict may be based on the field counts. In an embodiment, the field count associated with each keyword is used to determine whether the keyword is "important" for the URL. For example, a keyword may be identified as "important" if the keyword appears in 60 percent or more of the URLs represented by the corpus node 502, which may be determined by dividing the field count by the URL count. A conflict may be identified if a keyword for a child node is identified as important and the same keyword for the parent of the child node is not identified as important. If all of the child nodes of a parent are compatible, the child nodes can be subsumed, and the parent node changed to a leaf node 702. Each leaf node 702 of the resulting pruned corpus lattice 700 will include one or more primitive query groups.

At block 1020, the pruned corpus lattice 700 may be used to generate an output as described in reference to FIG. 9, the output being one or more cases. At block 910 of the output method 900 described in FIG. 9, a case is generated based on the corpus node 502 and stored to an output file. Each case may include a variety of data corresponding to the corpus node 502, for example, the host and path, the URL count, the fraction of total number of URLs in the overall URL corpus represented by the URL count, and the query fields.

In an embodiment, it may be desirable to prevent more than one case from covering the same primitive query group. During the output of cases, a record of primitive query groups that have contributed to a case may be kept. Before outputting a case, the primitive query groups are checked and added to the record. If the primitive query group is already included in the record, the primitive query group may be skipped or added to a separate set of files.

At block 1022, the current corpus lattice is cleared in preparation for the generation of the next corpus lattice. The process flow may then advance to block 1016, wherein a new query group is started.

Returning to block 1010, if there are no URLs remaining in the URL group, the process flow may advance to block 1024, wherein the current query group is processed as described in blocks 1012, 1018 and 1020 to generate cases for the last corpus lattice. The process flow may then advance to block 1026, wherein the process flow terminates.

Figure 11:
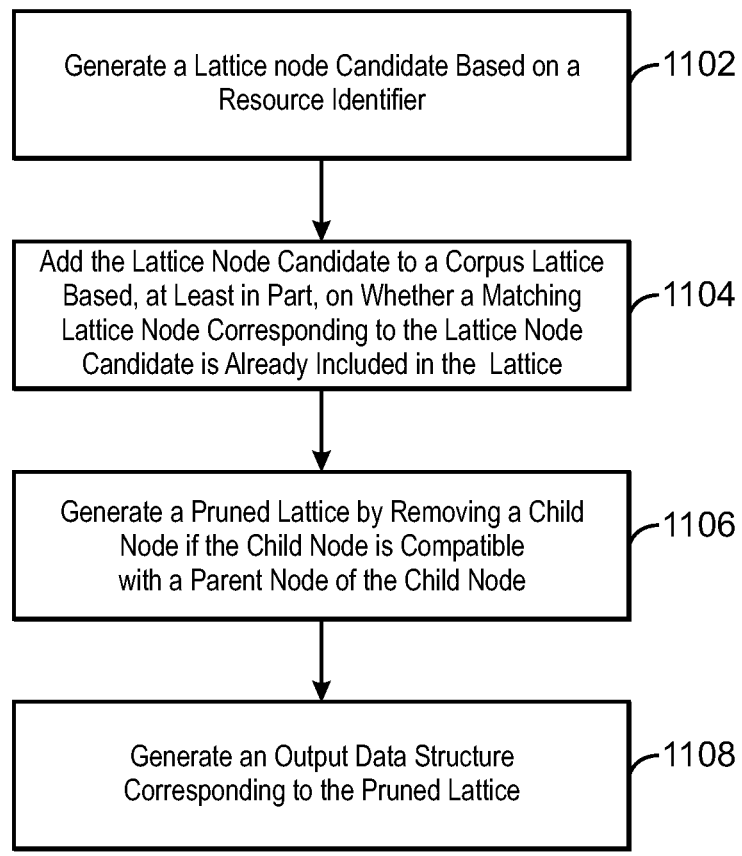
FIG. 11 is a process flow diagram of an overview of a method of processing Web activity data, in accordance with embodiments of the present invention.

FIG. 11 is a process flow diagram of an overview of a method of processing Web activity data, in accordance with embodiments of the present invention. The method is generally referred to by the reference number 1100 and may be executed by the URL processor 134 (FIG. 1). The method 1100 may begin at block 1102, wherein a node candidate is generated based on a resource identifier such as URL, as described in relation to FIGS. 2 and 3. The lattice node candidate includes a component corresponding to a portion of the resource identifier according to a dimension of specificity. For example, the lattice node candidate can include a host component corresponding to a portion of the URL host and a path component corresponding to a portion of the URL path. The lattice node candidate may also include a data set such as a field set or a query group.

At block 1104 the lattice node candidate may be added to a corpus lattice 500 based, at least in part, on whether a matching lattice node corresponding to the node candidate is already included in the corpus lattice 502. Each corpus node 502 of the corpus lattice 500 can include a data set that includes information from the corresponding to the one or more URLs used to generate the corpus node 502.

At block 1106 a pruned corpus lattice 700 may be generated by a process wherein a determination is made that a child node in the corpus lattice is compatible with a parent node of the child node and the child node is removed from the corpus lattice. In embodiments, the compatibility of the corpus nodes is determined based, at least in part, on the data sets associated with the corpus nodes.

At block 1108, an output data structure corresponding to the pruned corpus lattice may be generated. For example, the output file may include a database of URL recognizer information tables or one or more cases.

Figure 12:
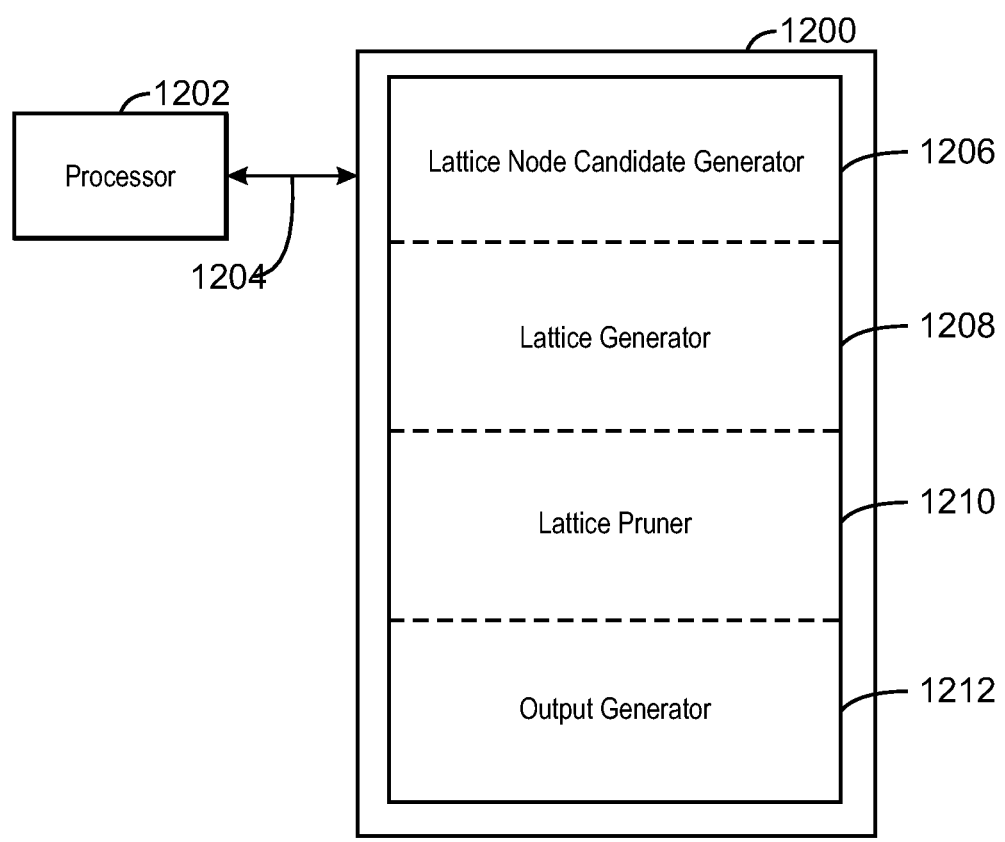
FIG. 12 is a block diagram showing a non-transitory, machine-readable medium that stores code configured to process Web activity data, in accordance with an embodiment of the present invention.

FIG. 12 is a block diagram showing a non-transitory, machine-readable medium that stores code configured to process Web activity data, in accordance with an embodiment of the present invention. The non-transitory, machine-readable medium is referred to by the reference number 1200. The non-transitory, machine-readable medium 1200 can include RAM, a hard disk drive, an array of hard disk drives, an optical drive, an array of optical drives, a non-volatile memory, a universal serial bus (USB) drive, a digital versatile disk (DVD), a compact disk (CD), and the like.

In an embodiment, the non-transitory, machine-readable medium 1200 stores a collection of data comprising Web activity data generated by a plurality of users at a plurality of Webpages. The Web activity data can include a plurality of URLs such as query URLs. The non-transitory, machine-readable medium 900 may be accessed by a processor 902 over a communication path 904.

As shown in FIG. 12, the various components discussed herein can be stored on the non-transitory, machine-readable medium 1200. A first region 1206 on the non-transitory, machine-readable medium 1200 can include a node candidate generator, configured to generate a URL node candidate based on a URL. The node candidate can include a host component corresponding to a portion of the URL host and a path component corresponding to a portion of the URL path. A region 1208 can include a corpus lattice generator configured to add the node candidate to a corpus lattice based, at least in part, on whether a matching corpus node 502 corresponding to the node candidate is already included in the corpus lattice 500. The corpus lattice 500 can include corpus nodes 502 corresponding to a plurality of URLs. One or more corpus nodes 502 can include a corresponding data set. A region 1210 can include a corpus lattice pruner configured to generate a pruned corpus lattice 500 by removing child nodes from the corpus lattice if the data sets associated with child nodes are compatible with one another and compatible with a parent node of the child nodes. A region 1212 can include a an output generator configured to generate an output data structure corresponding to the pruned corpus lattice, for example, one or more URL recognizer information tables or one or more cases. Although shown as contiguous blocks, the software components can be stored in any order or configuration. For example, if the non-transitory, machine-readable medium 1200 is a hard drive, the software components can be stored in non-contiguous, or even overlapping, sectors.

What is claimed is:

1. A method, comprising:
generating a node candidate in a system memory based on a resource identifier, wherein the node candidate includes a component corresponding to a portion of the resource identifier according to a dimension of specificity;
adding the node candidate to a corpus lattice in the system memory based, at least in part, on whether a matching corpus node corresponding to the node candidate is already included in the corpus lattice; wherein the corpus lattice includes corpus nodes corresponding to a plurality of resource identifiers;

generating a pruned corpus lattice by a process comprising determining that a child corpus node in the corpus lattice is compatible with a parent corpus node of the child corpus node and removing the child corpus node from the corpus lattice, wherein the child corpus node is compatible with the parent corpus node if a first data set associated with the child corpus node and a second data set associated with the parent corpus node do not conflict; and generating an output data structure corresponding to the pruned corpus lattice.

2. The method of claim 1, wherein the first and second data sets each include a data field name and a field state corresponding to the data field name, wherein the field state indicates a probability that the data field name is of a target class with respect to the corresponding corpus node.

3. The method of claim 2, wherein the first and second data sets are determined to be compatible if no data field name corresponds to a field state of "strong positive" in one of the first and second data sets and to "strong negative" in the other of the first and second data sets.

4. The method of claim 1, wherein the first and second data sets include a plurality of data field names and an occurrence count for each of the plurality of data field names; wherein the occurrence count corresponds to a number of times that the corresponding data field name appears in a group of URLs corresponding to a respective corpus node; and wherein the occurrence count is used to determine an importance level for the data field with respect to the respective corpus node.

5. The method of claim 4, wherein the first and second data sets are determined to be compatible based on a comparison of the importance levels determined for the data fields of the child corpus node and the importance levels determined for the data fields of the parent corpus node.

6. The method of claim 1, wherein:
the resource identifier comprises a Uniform Resource Locator (URL);
the node candidate includes a second component corresponding to a second portion of the resource identifier according to a second dimension of specificity; and
the dimension of specificity comprises a host of the URL and the second dimension of specificity comprises a path of the URL.

7. The method of claim 1, wherein adding the node candidate comprises:
identifying a first, unexpanded, corpus node as a parent of a second corpus node corresponding with the node candidate;
adding as a child node of the first corpus node a node corresponding to an extension of the first corpus node along a dimension of specificity; and
marking the first corpus node as an expanded node.

8. The method of claim 1, wherein generating the output data structure comprises generating an information table usable by a URL recognizer to identify a search term in a query field of a newly encountered URL.

9. The method of claim 1, wherein generating the output data structure comprises generating a case usable by a training system to develop a classifier, wherein the case includes a plurality URLs.

10. The method of claim 1, further comprising:
receiving a first resource identifier matching a pattern corresponding to a first corpus node in the pruned corpus lattice;
identifying, based on the output data structure, a rule applicable to the first resource identifier;
receiving a second resource identifier matching a pattern corresponding to the first corpus node; and
identifying, based on the output data structure, the rule as being applicable to the second resource identifier.

11. The method of claim 1, wherein the child corpus node is compatible with the parent corpus node if a state of a first data field in the first data set does not conflict with a state of a first data field in the second data set.

12. A computer system, comprising:
a processor that is configured to execute machine-readable instructions; and
a memory device that stores instruction modules that are executable by the processor, the instruction modules comprising:
a node candidate generator, configured to generate a node candidate based on a resource identifier, wherein the node candidate includes a component corresponding to a portion of the resource identifier according to a dimension of specificity;
a lattice generator configured to add the node candidate to a corpus lattice based, at least in part, on whether a matching corpus node corresponding to the node candidate is already included in the corpus lattice; wherein the corpus lattice includes corpus nodes corresponding to a plurality of resource identifiers;
a lattice pruner configured to generate a pruned corpus lattice by a process comprising determining that a child corpus node in the corpus lattice is compatible with a parent corpus node of the child corpus node and removing the child corpus node from the corpus lattice, wherein the child corpus node is compatible with the parent corpus node if a first data set associated with the child corpus node and a second data set associated with the parent corpus node do not conflict; and
an output generator configured to generate an output data structure corresponding to the pruned corpus lattice.

13. The computer system of claim 12, wherein the first and second data sets each include a data field name and a field state corresponding to the data field name, wherein the field state indicates a probability that the data field name is of a target class with respect to the corresponding corpus node.

14. The computer system of claim 12, wherein:
the resource identifier comprises a Uniform Resource Locator (URL);
the node candidate includes a second component corresponding to a second portion of the resource identifier according to a second dimension of specificity; and
the dimension of specificity comprises a host of the URL and the second dimension of specificity comprises a path of the URL.

15. The computer system of claim 12, wherein the lattice generator is configured to add the node candidate to the corpus lattice by a process comprising:
identifying a first, unexpanded, corpus node as a parent of a second corpus node corresponding with the node candidate;
adding as a child node of the first corpus node a node corresponding to an extension of the first corpus node along a dimension of specificity; and
marking the first corpus node as an expanded node.

16. The computer system of claim 12, wherein the child corpus node is compatible with the parent corpus node if a state of a first data field in the first data set does not conflict with a state of a first data field in the second data set.

17. A non-transitory computer readable medium, comprising code configured to direct a processor to:

generate a node candidate based on a resource identifier, wherein the node candidate includes a component corresponding to a portion of the resource identifier according to a dimension of specificity;

add the node candidate to a corpus lattice based, at least in part, on whether a matching corpus node corresponding to the node candidate is already included in the corpus lattice; wherein the corpus lattice includes corpus nodes corresponding to a plurality of resource identifiers;

generate a pruned corpus lattice by a process comprising determining that a child corpus node in the corpus lattice is compatible with a parent corpus node of the child corpus node and removing the child corpus node from the corpus lattice, wherein the child corpus node is compatible with the parent corpus node if a first data set associated with the child corpus node and a second data set associated with the parent corpus node do not conflict; and generate an output data structure corresponding to the pruned corpus lattice.

18. The non-transitory computer readable medium of claim 17, wherein:

the resource identifier comprises a Uniform Resource Locator (URL);

the node candidate includes a second component corresponding to a second portion of the resource identifier according to a second dimension of specificity; and the dimension of specificity comprises a host of the URL and the second dimension of specificity comprises a path of the URL.

19. The non-transitory computer readable medium of claim 17, comprising code configured to direct a processor to:

identify a first, unexpanded, corpus node as a parent of a second corpus node corresponding with the node candidate;

add as a child node of the first corpus node a node corresponding to an extension of the first corpus node along a dimension of specificity; and mark the first corpus node as an expanded node.

20. The non-transitory computer readable medium of claim 17, wherein the child corpus node is compatible with the parent corpus node if a state of a first data field in the first data set does not conflict with a state of a first data field in the second data set.

* * * * *